US012562411B2

(12) United States Patent
Moghimian et al.

(10) Patent No.: US 12,562,411 B2
(45) Date of Patent: Feb. 24, 2026

(54) MULTI-CYCLE FORMATION METHODS FOR SECONDARY BATTERY CELLS

(71) Applicant: VoltaXplore Inc., Montreal (CA)

(72) Inventors: Nima Moghimian, Saint Laurent (CA); Mohammad Mohsen Badv, Montreal (CA); Syed Atif Pervez, Saint-Laurent (CA); Seyed Milad Madinehei, Montreal (CA); Soroush Nazarpour, Saint-Laurent (CA)

(73) Assignee: VoltaXplore Inc., Montreal (CA)

( * ) Notice: Subject to any disclaimer, the term of this patent is extended or adjusted under 35 U.S.C. 154(b) by 235 days.

(21) Appl. No.: 18/407,666

(22) Filed: Jan. 9, 2024

(65) Prior Publication Data

US 2024/0234841 A1     Jul. 11, 2024

Related U.S. Application Data

(60) Provisional application No. 63/438,093, filed on Jan. 10, 2023.

(51) Int. Cl.
H01M 10/44 (2006.01)
H01M 10/0525 (2010.01)

(52) U.S. Cl.
CPC ..... H01M 10/446 (2013.01); H01M 10/0525 (2013.01)

(58) Field of Classification Search
CPC ........................ H01M 10/446; H01M 10/0525
See application file for complete search history.

(56) References Cited

U.S. PATENT DOCUMENTS 9,469,542 B2     10/2016 Bozalina et al.
2014/0123477 A1     5/2014 Safont Sempere et al.

FOREIGN PATENT DOCUMENTS

CA     2414982 A1     6/2003
CA     2772087 C     8/2018
CA     3114556 A1     4/2020
(Continued)

OTHER PUBLICATIONS

International Preliminary Report of Patentability for International Application No. PCT/CA2024/050018 dated Jul. 24, 2025, 5 pages.
(Continued)

*Primary Examiner* — Sarah A. Slifka
(74) *Attorney, Agent, or Firm* — Cooley LLP

(57) ABSTRACT

In some aspects, a method can include applying a charge to a battery at an initial charge rate, the battery including an anode with silicon particles and graphene particles, a cathode, and a separator disposed between the anode and the cathode, the battery having a maximum voltage of $V_{max}$, allowing the battery to rest for a first resting period, applying a charge to the battery at a first formation charge rate, discharging the battery at a first formation discharge rate, applying a charge to the battery at a second formation charge rate, the second formation charge rate greater than the first formation charge rate, discharging the battery at a second formation discharge rate, and applying a charge to the battery at a third formation charge rate to form the secondary battery, the third formation charge rate greater than or equal to the second formation charge rate.

26 Claims, 6 Drawing Sheets

(56) References Cited

FOREIGN PATENT DOCUMENTS

WO      WO-2024148426 A1      7/2024

OTHER PUBLICATIONS

International Search Report and Written Opinion for International Application No. PCT/CA2024/050018 dated Mar. 26, 2024, 8 pages.
U.S. Appl. No. 63/352,814, titled "Rechargeable Cylindrical Battery with Graphene Centerpin, and Methods of Producing the Same," filed Jun. 16, 2022, 24 pages.

FIG. 1

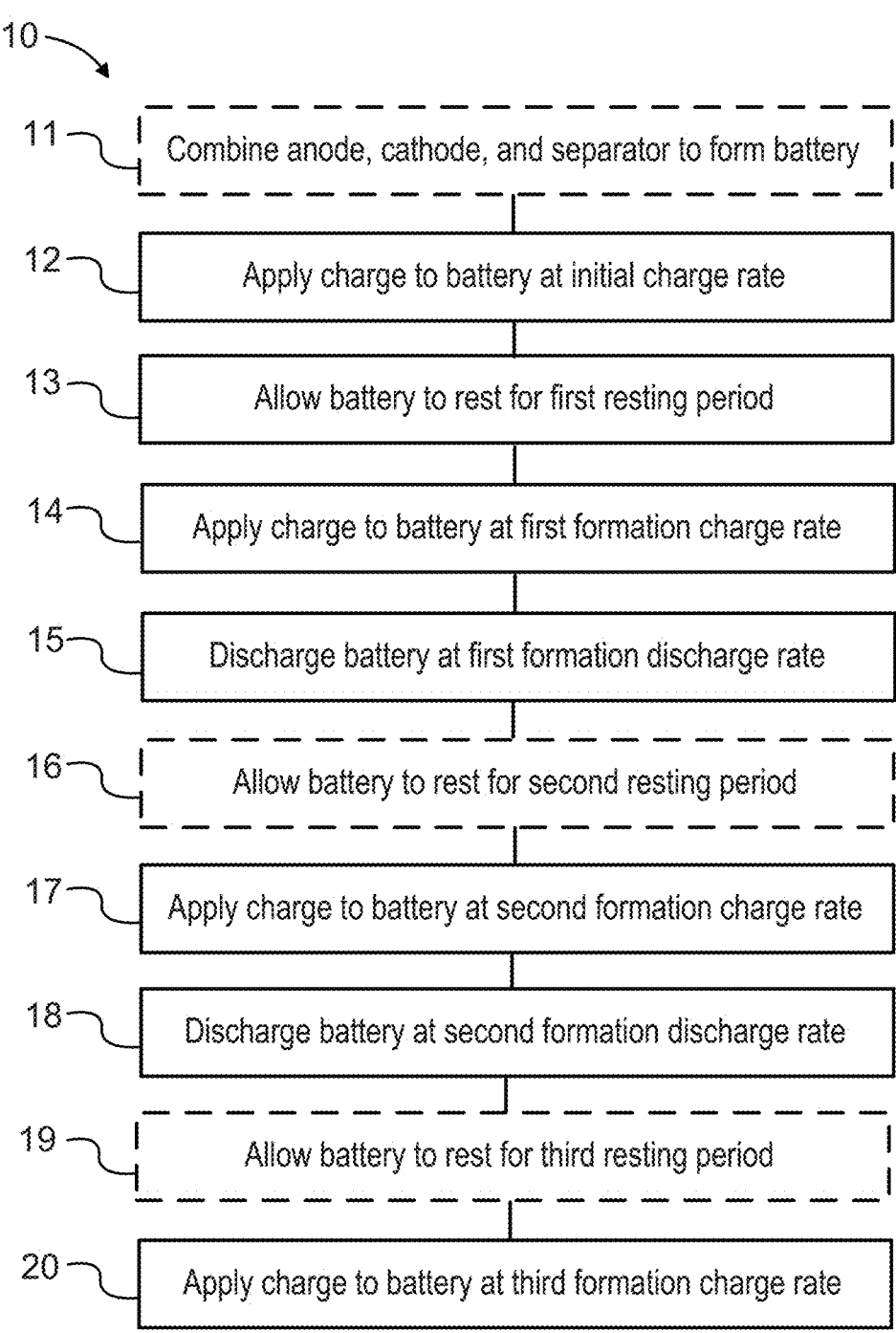

10

11 — Combine anode, cathode, and separator to form battery

12 — Apply charge to battery at initial charge rate

13 — Allow battery to rest for first resting period

14 — Apply charge to battery at first formation charge rate

15 — Discharge battery at first formation discharge rate

16 — Allow battery to rest for second resting period

17 — Apply charge to battery at second formation charge rate

18 — Discharge battery at second formation discharge rate

19 — Allow battery to rest for third resting period

20 — Apply charge to battery at third formation charge rate

FIG. 2

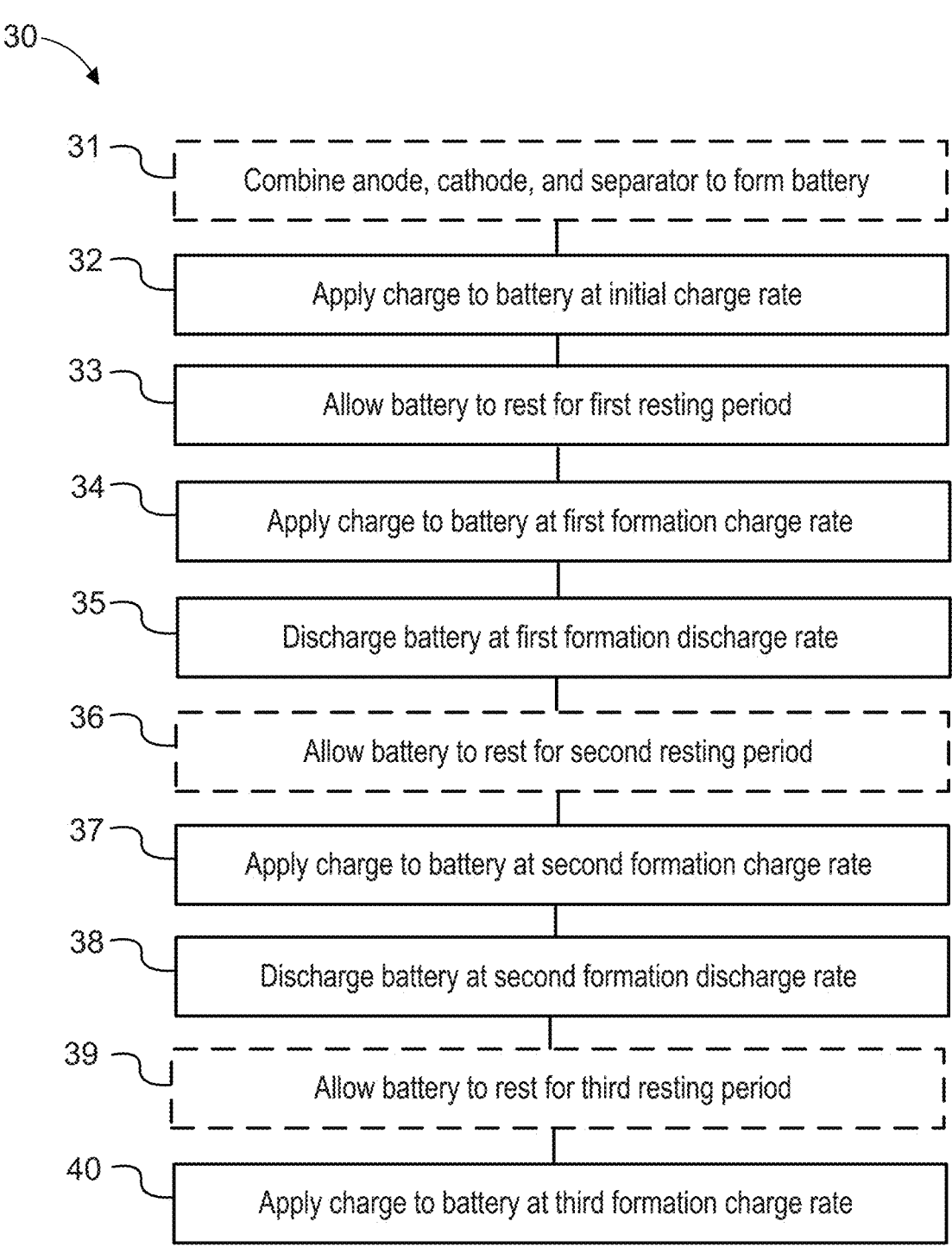

30

31 — Combine anode, cathode, and separator to form battery

32 — Apply charge to battery at initial charge rate

33 — Allow battery to rest for first resting period

34 — Apply charge to battery at first formation charge rate

35 — Discharge battery at first formation discharge rate

36 — Allow battery to rest for second resting period

37 — Apply charge to battery at second formation charge rate

38 — Discharge battery at second formation discharge rate

39 — Allow battery to rest for third resting period

40 — Apply charge to battery at third formation charge rate

FIG. 5

Cycle Life

MULTI-CYCLE FORMATION METHODS FOR SECONDARY BATTERY CELLS

RELATED APPLICATIONS

This application claims priority to and the benefit of U.S. Provisional Patent Application No. 63/438,093, filed Jan. 10, 2023 and titled, "Multi-Cycle Formation Methods for Secondary Battery Cells," the disclosure of which is hereby incorporated by reference in its entirety.

TECHNICAL FIELD

Embodiments described herein relate to secondary batteries and methods of forming the same.

BACKGROUND

Formation of batteries includes initial charge and discharge operations at the end of the battery manufacturing process. Batteries undergo a formation process to controllably create a stable solid electrolyte interface (SEI) layer within the electrodes of the battery. The stability and uniformity of the SEI layer are important factors in the life cycle of the battery. Defects such as unstable, excessive, or non-uniform SEI layers can negatively affect the capacity retention of the battery. Such defects can re-expose the active materials of the electrodes to the electrolyte, resulting in continuous electrolyte decomposition and loss of electroactive material. This leads to a loss of capacity and cycle life of the battery. Stabilizing the SEI can improve the capacity retention of the battery.

SUMMARY

Embodiments described herein relate to methods of forming a secondary battery with a stable SEI layer. In some aspects, a method can include applying a charge to a battery at an initial charge rate, the battery including an anode with silicon particles and graphene particles, a cathode, and a separator disposed between the anode and the cathode, the battery having a maximum voltage of $V_{max}$, allowing the battery to rest for a first resting period, applying a charge to the battery at a first formation charge rate, discharging the battery at a first formation discharge rate, applying a charge to the battery at a second formation charge rate, the second formation charge rate greater than the first formation charge rate, discharging the battery at a second formation discharge rate, and applying a charge to the battery at a third formation charge rate to form the secondary battery, the third formation charge rate greater than or equal to the second formation charge rate.

In some embodiments, the first resting period can be less than about 2 hours. In some embodiments, the battery can be a lithium-ion battery. In some embodiments, after discharging the battery at the first formation discharge rate, the method can include allowing the battery to rest for a second resting period, the second resting period between about 30 minutes and about 90 minutes.

BRIEF DESCRIPTION OF THE DRAWINGS

FIG. 1 is a flow diagram of a method of producing a secondary battery, according to an embodiment.
FIG. 2 is a flow diagram of a method of producing a secondary battery, according to an embodiment.

FIG. 5 shows a comparison of the cycle life of a lithium-ion battery formed via standard formation methods and the cycle life of a lithium-ion battery formed via a formation protocol described herein.

DETAILED DESCRIPTION

Figure 3:
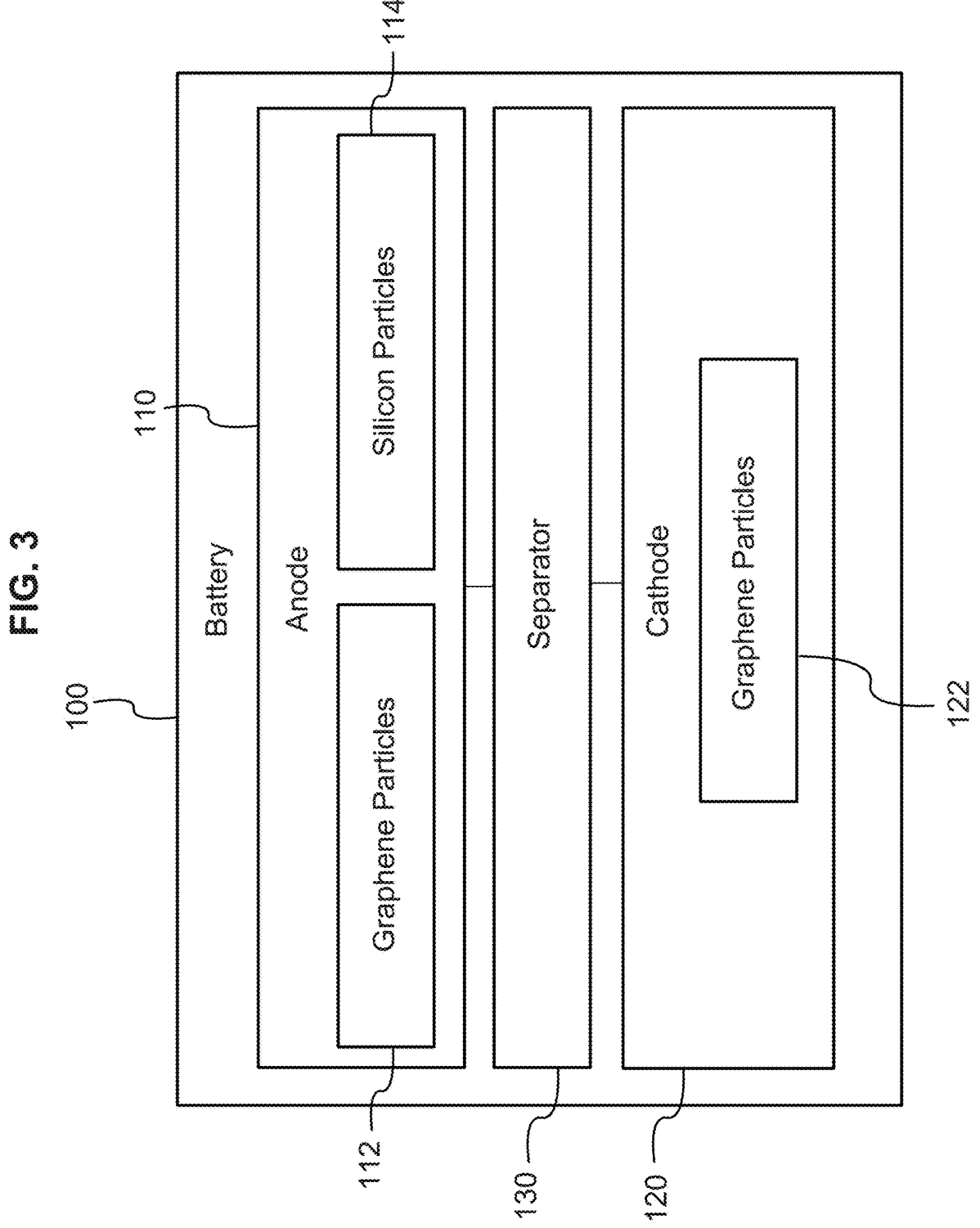
FIG. 3 is a block diagram of a secondary battery, according to an embodiment.

Embodiments described herein relate to methods of shortening the formation period for secondary batteries. Batteries described herein can include graphene. In some embodiments, the graphene can be disposed in an anode of the battery. In some embodiments, the graphene can be disposed in a cathode of the battery. The formation methods described herein can aid in maximizing specific capacity retention by minimizing lithium loss and electrolyte depletion, which can increase the cycle life of the battery.

A dense and stable SEI layer usually involves a controlled, slow charge and discharge steps with long rests and aging intervals. These slow formation steps can significantly increase the cost of cell manufacturing, as the batteries can occupy large amounts of space for long periods of time. The formation and aging of batteries often make up a significant cost of producing batteries. Depending on the formation method, cell chemistry, and aging conditions, the entire formation process can take several weeks to finish.

Embodiments described herein relate to methods of forming batteries that have similar cycling properties to cells formed with conventional long formation methods. Batteries formed according to methods described herein can be formed significantly faster than conventional batteries. Several "dynamic forming" processes have been utilized traditionally. Such methods can include: (1) Charging at a small C-rate until the SEI is completely formed (a long process), marked by a threshold voltage; or (2) A large C-rate to reach the final voltage of the cell. Such methods typically include rest and aging periods and take at least 40 hours to complete.

Other strategies can include incorporating additives to the electrolyte to have more precise control on SEI formation. Such additives can impact the electrochemistry of the electrolyte and change redox potentials of other reactions, making material selection and cell design more challenging. Aging at elevated temperatures combined with impedance measurement has also been used in several commercial processes. However, such methods employ more equipment, complicate production processes, and add costs to the production processes.

Embodiments described herein include fast and effective formation protocols of forming batteries with stable SEI layers. Such fast-charging protocols can be enabled via the inclusion of graphene in the electrodes. In some embodiments, the graphene can be incorporated into an anode of the battery. In some embodiments, the graphene can be incorporated into a cathode of the battery. In some embodiments, the battery can be a lithium-ion battery. The stabilization of the SEI layer can allow for high-capacity retention and thereby an improved cycle life without sacrificing manufacturing time and cost.

Embodiments described herein include an activation step, which includes charging the battery at a low rate or a short time, enabling controllable deposition of the SEI layer at the onset of the formation process. The presence of graphene in one or more of the electrodes can enable much faster charging (higher C-rates) during subsequent cycles because the charge transfer step becomes more efficient in the presence of graphene. Graphene's high conductivity is an important asset to the formation process, particularly at high voltages (e.g., $>0.85 \times V_{max}$) because it compensates for silicon's low electrical conductivity (a limiting factor in the kinetics of the battery during the formation process).

In some embodiments, graphene flakes described herein can have any of the properties of the graphene flakes described in U.S. Pat. No. 9,469,542 ("the '542 patent"), filed Dec. 22, 2015 and titled, "Large Scale Production of Thinned Graphite, Graphene, and Graphite-Graphene Composites," the disclosure of which is hereby incorporated by reference in its entirety.

As used herein, the term "crystalline graphite" or "precursor crystalline graphite" refers to graphite-based material of a crystalline structure with a size configured to allow ball milling in a ball milling jar. For example, the crystalline graphite can be layered graphene sheets with or without defects, such defects comprising vacancies, interstitials, line defects, etc. The crystalline graphite may come in diverse forms, such as but not limited to ordered graphite including natural crystalline graphite, pyrolytic graphite (e.g., highly ordered pyrolytic graphite (HOPG)), graphite fiber, graphite rods, graphite minerals, graphite powder, flake graphite, any graphitic material modified physically and/or chemically to be crystalline, and/or the like. As another example, the crystalline graphite can be graphite oxide.

As used herein, the term "thinned graphite" refers to crystalline graphite that has had its thickness reduced to a thickness from about a single layer of graphene to about 1,200 layers, which is roughly equivalent to about 400 nm. As such, single layer graphene sheets, few-layer graphene (FLG) sheets, and in general multi-layer graphene sheets with a number of layers about equal to or less than 1,200 graphene layers can be referred as thinned graphite.

As used herein, the term "few-layer graphene" (FLG) refers to crystalline graphite that has a thickness from about 1 graphene layer to about 10 graphene layers.

As used herein, the term "lateral size" or "lateral sheet size" relates to the in-plane linear dimension of a crystalline material. For example, the linear dimension can be a radius, diameters, width, length, diagonal, etc., if the in-plane shape of the material can be at least approximated as a regular geometrical object (e.g., circle, square, etc.). If the in-plane shape of the material cannot be modeled by regular geometrical objects relatively accurately, the linear dimension can be expressed by characteristic parameters as is known in the art (e.g., by using shape or form factors).

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, "$V_{max}$" refers to the maximum voltage of a battery when fully charged (i.e., when the battery reaches 100% state of charge (SOC)).

As used herein, "C-rate" refers to a level of constant current charge or discharge that a cell can sustain for one hour of time. Commonly, the charge and/or discharge current of a battery are measured with respect to the battery's capacity instead of absolute current. For example, charging at a C-rate of 1 C means that the battery is charged from 0 to 100% in one hour. Similarly, charging at a C-rate of 0.5 C means that the battery is charged from 0 to 100% in 2 hours. Similarly, charging at a C-rate of 2 C means that the battery is charged from 0 to 100% in 30 minutes.

FIG. 1 is a flow diagram of a method 10 of producing a secondary battery, according to an embodiment. As shown, the method 10 optionally includes combining an anode, a cathode, and a separator at step 11 to form a battery. The method 10 includes applying a charge to the battery at an initial charge rate at step 12, allowing the battery to rest for a first resting period at step 13, applying a charge to the battery at a first formation charge rate at step 14, and discharging the battery at the first formation discharge rate at step 15. The method 10 optionally includes allowing the battery to rest for a second resting period at step 16. The method 10 further includes applying a charge to the battery at a second formation charge rate at step 17 and discharging the battery at a second formation discharge rate at step 18. The method 10 optionally includes allowing the battery to rest for a third resting period at step 19. The method 10 further includes applying a charge to the battery at a third formation charge rate at step 20. In some embodiments, the total duration of the method 10 can be less than about 20 hours, less than about 18 hours, less than about 17 hours, less than about 16 hours, less than about 15 hours, less than about 14 hours, less than about 13 hours, less than about 12 hours, less than about 11 hours, less than about 10 hours, less than about 9 hours, or less than about 8 hours.

The bulk of the SEI layer is formed when the battery cycles between about $0.85 \times V_{max}$ and about $0.97 \times V_{max}$, as high voltages allow for redox reactions at the anode and the cathode to become more significant. Also, graphene incorporated into the electrodes can impart a buffering effect. For example, graphene wrapped around silicon can buffer the expansion of silicon particles. The method 10 can include broader cycling than conventional formation processes. For example, instead of cycling at least four times between $0.93 \times V_{max}$ and $0.97 \times V_{max}$, the method 10 can include cycling two times between about $0.85 \times V_{max}$ and about $0.97 \times V_{max}$. This can save formation time and can allow tailoring of SEI deposition by applying a wider potential window.

Step 11 is optional and includes combining an anode, a cathode, and a separator to form a battery. In some embodiments, the anode, the cathode, and the separator can be arranged in a stack. In some embodiments, the anode, the cathode, and the separator can be disposed in a can. In some embodiments, the anode, the cathode, and the separator can be arranged in a prism shape. In some embodiments, the anode can include silicon. In some embodiments, the anode can include graphene particles. In some embodiments, the anode can include graphene sheets. In some embodiments, the anode can include graphene flakes. In some embodiments, the cathode can include graphene particles. In some embodiments, the cathode can include graphene sheets. In some embodiments, the cathode can include graphene flakes.

Step 12 includes applying a charge to the battery at an initial charge rate (also referred to herein as a "tap charge"). In some embodiments, charging at the initial charge rate enables a stable preliminary SEI deposit on the anode. In some embodiments, the tap charge can aid in building the SEI layer more uniformly. In some embodiments, the tap charge can aid in avoiding copper corrosion (i.e., in the anode current collector). This deposit can be at relatively low potentials, compared to Li/Li+ potentials. In some embodiments, the initial charge rate can be at least about 0.01 C, at least about 0.011 C, at least about 0.012 C, at least about 0.013 C, at least about 0.014 C, at least about 0.015 C, at least about 0.016 C, at least about 0.017 C, at least about 0.018 C, at least about 0.019 C, at least about 0.02 C, at least about 0.021 C, at least about 0.022 C, at least about 0.023 C, at least about 0.024 C, at least about 0.025 C, at least about 0.026 C, at least about 0.027 C, at least about 0.028 C, or at least about 0.029 C. In some embodiments, the initial charge rate can be no more than about 0.03 C, no more than about 0.029 C, no more than about 0.028 C, no more than about 0.027 C, no more than about 0.026 C, no more than about 0.025 C, no more than about 0.024 C, no more than about 0.023 C, no more than about 0.022 C, no more than about 0.021 C, no more than about 0.02 C, no more than about 0.019 C, no more than about 0.018 C, no more than about 0.017 C, no more than about 0.016 C, no more than about 0.015 C, no more than about 0.014 C, no more than about 0.013 C, no more than about 0.012 C, or no more than about 0.011 C. Combinations of the above-referenced charge rates are also possible (e.g., at least about 0.01 C and no more than about 0.03 C or at least about 0.015 C and no more than about 0.025 C), inclusive of all values and ranges therebetween. In some embodiments, the initial charge rate can be about 0.01 C, about 0.011 C, about 0.012 C, about 0.013 C, about 0.014 C, about 0.015 C, about 0.016 C, about 0.017 C, about 0.018 C, about 0.019 C, about 0.02 C, about 0.021 C, about 0.022 C, about 0.023 C, about 0.024 C, about 0.025 C, about 0.026 C, about 0.027 C, about 0.028 C, about 0.029 C, or about 0.03 C.

In some embodiments, the initial charge rate can be applied for at least about 20 minutes, at least about 30 minutes, at least about 40 minutes, at least about 50 minutes, at least about 1 hour, at least about 1.5 hours, at least about 2 hours, or at least about 2.5 hours. In some embodiments, the initial charge rate can be applied for no more than about 3 hours, no more than about 2.5 hours, no more than about 2 hours, no more than about 1.5 hours, no more than about 1 hour, no more than about 50 minutes, no more than about 40 minutes, or no more than about 30 minutes. Combinations of the above-referenced durations of the initial charge are also possible (e.g., at least about 20 minutes and no more than about 3 hours or at least about 1 hour and no more than about 2 hours), inclusive of all values and ranges therebetween. In some embodiments, the initial charge rate can be applied for about 20 minutes, about 30 minutes, about 40 minutes, about 50 minutes, about 1 hour, about 1.5 hours, about 2 hours, about 2.5 hours, or about 3 hours.

At step 13, the battery is subjected to a first resting period. In some embodiments, the first resting period can be at least about 30 minutes, at least about 40 minutes, at least about 50 minutes, at least about 1 hour, at least about 1.1 hours, at least about 1.2 hours, at least about 1.3 hours, or at least about 1.4 hours. In some embodiments, the first resting period can be no more than about 1.5 hours, no more than about 1.4 hours, no more than about 1.3 hours, no more than about 1.2 hours, no more than about 1.1 hours, no more than about 1 hour, no more than about 50 minutes, or no more than about 40 minutes. Combinations of the above-referenced durations of the first resting period are also possible (e.g., at least about 30 minutes and no more than about 1.5 hours or at least about 40 minutes and no more than about 1.5 hours), inclusive of all values and ranges therebetween. In some embodiments, the first resting period can be about 30 minutes, about 40 minutes, about 50 minutes, about 1 hour, about 1.1 hours, about 1.2 hours, about 1.3 hours, about 1.4 hours or about 1.5 hours.

In some embodiments, the first resting period can be at room temperature. In some embodiments, the first resting period can be at a temperature of at least about 10° C., at least about 11° C., at least about 12° C., at least about 13° C., at least about 14° C., at least about 15° C., at least about 16° C., at least about 17° C., at least about 18° C., at least about 19° C., at least about 20° C., at least about 21° C., at least about 22° C., at least about 23° C., at least about 24° C., at least about 25° C., at least about 26° C., at least about 27° C., at least about 28° C., or at least about 29° C. In some embodiments, the first resting period can be at a temperature of no more than about 30° C., no more than about 29° C., no more than about 28° C., no more than about 27° C., no more than about 26° C., no more than about 25° C., no more than about 24° C., no more than about 23° C., no more than about 22° C., no more than about 21° C., no more than about 20° C., no more than about 19° C., no more than about 18° C., no more than about 17° C., no more than about 16° C., no more than about 15° C., no more than about 14° C., no more than about 13° C., no more than about 12° C., or no more than about 11° C. Co.

Combinations of the above-referenced temperatures are also possible (e.g., at least about 10° C. and no more than about 30° C. or at least about 15° C. and no more than about 25° C.), inclusive of all values and ranges therebetween. In some embodiments, the first resting period can be at a temperature of about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

Step 14 includes applying a charge to the battery at the first formation charge rate. Step 14 includes the beginning of the first formation charge cycle of the SEI. The first formation cycle aids in stabilizing the SEI layer. The charge and discharge rates during the initial formation cycle should be low enough to allow for higher charge and discharge rates in the later steps. However, the method 10 allows for the formation of a stable SEI without a need to prolong the formation charge of the battery.

In some embodiments, the battery can be charged at the first formation charge rate to reach a voltage of at least about $0.95 \times V_{max}$, at least about $0.955 \times V_{max}$, at least about $0.96 \times V_{max}$, at least about $0.965 \times V_{max}$, at least about $0.97 \times V_{max}$, or at least about $0.975 \times V_{max}$. In some embodiments, the battery can be charged at the first formation charge rate to reach a voltage of no more than about $0.98 \times V_{max}$, no more than about $0.975 \times V_{max}$, no more than about $0.97 \times V_{max}$, no more than about $0.965 \times V_{max}$, no more than about $0.96 \times V_{max}$, or no more than about $0.955 \times V_{max}$. Combinations of the above-referenced voltages are also possible (e.g., at least about $0.95 \times V_{max}$ and no more than about $0.98 \times V_{max}$ or at least about $0.96 \times V_{max}$ and no more than about $0.97 \times V_{max}$), inclusive of all values and ranges therebetween. In some embodiments, the battery can be charged at the first formation charge rate to reach a voltage of about $0.95 \times V_{max}$, about $0.955 \times V_{max}$, about $0.96 \times V_{max}$, about $0.965 \times V_{max}$, about $0.97 \times V_{max}$, about $0.975 \times V_{max}$, or about $0.98 \times V_{max}$.

In some embodiments, the first formation charge rate can be at least about 0.1 C, at least about 0.11 C, at least about 0.12 C, at least about 0.13 C, at least about 0.14 C, at least about 0.15 C, at least about 0.16 C, at least about 0.17 C, at least about 0.18 C, at least about 0.19 C, at least about 0.2 C, at least about 0.21 C, at least about 0.22 C, at least about 0.23 C, at least about 0.24 C, at least about 0.25 C, at least about 0.26 C, at least about 0.27 C, at least about 0.28 C, or at least about 0.29 C. In some embodiments, the first formation charge rate can be no more than about 0.3 C, no more than about 0.29 C, no more than about 0.28 C, no more than about 0.27 C, no more than about 0.26 C, no more than about 0.25 C, no more than about 0.24 C, no more than about 0.23 C, no more than about 0.22 C, no more than about 0.21 C, no more than about 0.2 C, no more than about 0.19 C, no more than about 0.18 C, no more than about 0.17 C, no more than about 0.16 C, no more than about 0.15 C, no more than about 0.14 C, no more than about 0.13 C, no more than about 0.12 C, or no more than about 0.11 C. Combinations of the above-referenced charge rates are also possible (e.g., at least about 0.1 C and no more than about 0.3 C or at least about 0.15 C and no more than about 0.25 C), inclusive of all values and ranges therebetween. In some embodiments, the first formation charge rate can be about 0.1 C, about 0.11 C, about 0.12 C, about 0.13 C, about 0.14 C, about 0.15 C, about 0.16 C, about 0.17 C, about 0.18 C, about 0.19 C, about 0.2 C, about 0.21 C, about 0.22 C, about 0.23 C, about 0.24 C, about 0.25 C, about 0.26 C, about 0.27 C, about 0.28 C, about 0.29 C, or about 0.3 C.

In some embodiments, the first formation charge can include a constant voltage charge with any of the above-referenced voltages as the constant voltage and a cutoff current. In some embodiments, the cutoff current can be at least about 0.03 C, at least about 0.035 C, at least about 0.04 C, at least about 0.045 C, at least about 0.05 C, at least about 0.055 C, at least about 0.06 C, or at least about 0.065 C. In some embodiments, the cutoff current can be no more than about 0.07 C, no more than about 0.065 C, no more than about 0.06 C, no more than about 0.055 C, no more than about 0.05 C, no more than about 0.045 C, no more than about 0.04 C, or no more than about 0.035 C. Combinations of the above-referenced cutoff currents are also possible (e.g., at least about 0.03 C and no more than about 0.07 C or at least about 0.04 C and no more than about 0.06 C), inclusive of all values and ranges therebetween.

In some embodiments, the first formation charge rate can be applied for at least about 30 minutes, at least about 40 minutes, at least about 50 minutes, at least about 1 hour, at least about 1.5 hours, at least about 2 hours, or at least about 2.5 hours. In some embodiments, the first formation charge rate can be applied for no more than about 3 hours, no more than about 2.5 hours, no more than about 2 hours, no more than about 1.5 hours, no more than about 1 hour, no more than about 50 minutes, or no more than about 40 minutes. Combinations of the above-referenced durations of the first formation charge are also possible (e.g., at least about 30 minutes and no more than about 3 hours or at least about 1 hour and no more than about 2 hours), inclusive of all values and ranges therebetween. In some embodiments, the first formation charge rate can be applied for about 30 minutes, about 40 minutes, about 50 minutes, about 1 hour, about 1.5 hours, about 2 hours, about 2.5 hours, or about 3 hours.

Step 15 includes discharging the battery at a first formation discharge rate. The first formation discharge is a shallow discharge. The shallow discharge minimizes disturbance to the formation of the stable SEI layer. Limiting the voltage window can aid in maintaining structural integrity and stability of silicon particles in the battery and can minimize the large volume variations of silicon particles that can be caused by a deep charge and discharge. In some embodiments, the battery can be discharged at the first formation discharge rate to a voltage of at least about $0.8 \times V_{max}$, at least about $0.81 \times V_{max}$, at least about $0.82 \times V_{max}$, at least about $0.83 \times V_{max}$, at least about $0.84 \times V_{max}$, at least about $0.85 \times V_{max}$, at least about $0.86 \times V_{max}$, at least about $0.87 \times V_{max}$, at least about $0.88 \times V_{max}$, or at least about $0.89 \times V_{max}$. In some embodiments, the battery can be discharged at the first formation discharge rate to a voltage of no more than about $0.90 \times V_{max}$, no more than about $0.89 \times V_{max}$, no more than about $0.88 \times V_{max}$, no more than about $0.87 \times V_{max}$, no more than about $0.86 \times V_{max}$, no more than about $0.85 \times V_{max}$, no more than about $0.84 \times V_{max}$, no more than about $0.83 \times V_{max}$, no more than about $0.82 \times V_{max}$, or no more than about $0.81 \times V_{max}$. Combinations of the above-referenced voltages are also possible (e.g., at least about $0.8 \times V_{max}$ and no more than about $0.9 \times V_{max}$ or at least about $0.82 \times V_{max}$ and no more than about $0.87 \times V_{max}$), inclusive of all values and ranges therebetween. In some embodiments, the battery can be discharged at the first formation discharge rate to a voltage of about $0.8 \times V_{max}$, about $0.81 \times V_{max}$, about $0.82 \times V_{max}$, about $0.83 \times V_{max}$, about $0.84 \times V_{max}$, about $0.85 \times V_{max}$, about $0.86 \times V_{max}$, about $0.87 \times V_{max}$, about $0.88 \times V_{max}$, about $0.89 \times V_{max}$, or about $0.9 \times V_{max}$.

In some embodiments, the first formation discharge rate can be at least about 0.1 C, at least about 0.11 C, at least about 0.12 C, at least about 0.13 C, at least about 0.14 C, at least about 0.15 C, at least about 0.16 C, at least about 0.17 C, at least about 0.18 C, at least about 0.19 C, at least about 0.2 C, at least about 0.21 C, at least about 0.22 C, at least about 0.23 C, at least about 0.24 C, at least about 0.25 C, at least about 0.26 C, at least about 0.27 C, at least about 0.28 C, or at least about 0.29 C. In some embodiments, the first formation discharge rate can be no more than about 0.3 C, no more than about 0.29 C, no more than about 0.28 C, no more than about 0.27 C, no more than about 0.26 C, no more than about 0.25 C, no more than about 0.24 C, no more than about 0.23 C, no more than about 0.22 C, no more than about 0.21 C, no more than about 0.2 C, no more than about 0.19 C, no more than about 0.18 C, no more than about 0.17 C, no more than about 0.16 C, no more than about 0.15 C, no more than about 0.14 C, no more than about 0.13 C, no more than about 0.12 C, or no more than about 0.21 C. Combinations of the above-referenced discharge rates are also possible (e.g., at least about 0.1 C and no more than about 0.3 C or at least about 0.15 C and no more than about 0.25 C), inclusive of all values and ranges therebetween. In some embodiments, the first formation discharge rate can be about 0.1 C, about 0.11 C, about 0.12 C, about 0.13 C, about 0.14 C, about 0.15 C, about 0.16 C, about 0.17 C, about 0.18 C, about 0.19 C, about 0.2 C, about 0.21 C, about 0.22 C, about 0.23 C, about 0.24 C, about 0.25 C, about 0.26 C, about 0.27 C, about 0.28 C, about 0.29 C, or about 0.3 C.

In some embodiments, the first formation discharge rate can be applied for at least about 30 minutes, at least about 40 minutes, at least about 50 minutes, at least about 1 hour, at least about 1.5 hours, at least about 2 hours, or at least about 2.5 hours. In some embodiments, the first formation discharge rate can be applied for no more than about 3 hours, no more than about 2.5 hours, no more than about 2 hours, no more than about 1.5 hours, no more than about 1 hour, no more than about 50 minutes, or no more than about 40 minutes. Combinations of the above-referenced durations of the first formation charge are also possible (e.g., at least about 30 minutes and no more than about 3 hours or at least about 1 hour and no more than about 2 hours), inclusive of all values and ranges therebetween. In some embodiments, the first formation discharge rate can be applied for about 30 minutes, about 40 minutes, about 50 minutes, about 1 hour, about 1.5 hours, about 2 hours, about 2.5 hours, or about 3 hours.

Step 16 is optional and includes allowing the battery to rest for a second resting period. In some embodiments, the second resting period can be at least about 30 minutes, at least about 40 minutes, at least about 50 minutes, at least about 1 hour, at least about 1.1 hours, at least about 1.2 hours, at least about 1.3 hours, or at least about 1.4 hours. In some embodiments, the second resting period can be no more than about 1.5 hours, no more than about 1.4 hours, no more than about 1.3 hours, no more than about 1.2 hours, no more than about 1.1 hours, no more than about 1 hour, no more than about 50 minutes, or no more than about 40 minutes. Combinations of the above-referenced durations of the second resting period are also possible (e.g., at least about 30 minutes and no more than about 1.5 hours or at least about 40 minutes and no more than about 1.5 hours), inclusive of all values and ranges therebetween. In some embodiments, the second resting period can be about 30 minutes, about 40 minutes, about 50 minutes, about 1 hour, about 1.1 hours, about 1.2 hours, about 1.3 hours, about 1.4 hours, or about 1.5 hours.

In some embodiments, the second resting period can be at room temperature. In some embodiments, the second resting period can be at a temperature of at least about 10° C., at least about 11° C., at least about 12° C., at least about 13° C., at least about 14° C., at least about 15° C., at least about 16° C., at least about 17° C., at least about 18° C., at least about 19° C., at least about 20° C., at least about 21° C., at least about 22° C., at least about 23° C., at least about 24° C., at least about 25° C., at least about 26° C., at least about 27° C., at least about 28° C., or at least about 29° C. In some embodiments, the second resting period can be at a temperature of no more than about 30° C., no more than about 29° C., no more than about 28° C., no more than about 27° C., no more than about 26° C., no more than about 25° C., no more than about 24° C., no more than about 23° C., no more than about 22° C., no more than about 21° C., no more than about 20° C., no more than about 19° C., no more than about 18° C., no more than about 17° C., no more than about 16° C., no more than about 15° C., no more than about 14° C., no more than about 13° C., no more than about 12° C., or no more than about 11° C. Combinations of the above-referenced temperatures are also possible (e.g., at least about 10° C. and no more than about 30° C. or at least about 15° C. and no more than about 25° C.), inclusive of all values and ranges therebetween. In some embodiments, the second resting period can be at a temperature of about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

Step 17 includes applying a charge to the battery at the second formation charge rate. The second formation charge rate can be larger than the first formation charge rate described above with reference to step 14. The second formation charge can have a high current. A high current (e.g., about 0.5 C) in conventional battery formation protocols can result in a non-uniform SEI growth or lithium plating (i.e., dendrites) in the absence of graphene. The inclusion of graphene in the anode and/or the cathode provides fast electron transport pathways and thereby enables faster formation steps, saving significant time and reducing manufacturing costs.

In some embodiments, the second formation charge rate can be greater than the first formation charge rate. In some embodiments, the second formation charge rate can be equal to or substantially similar to the first formation charge rate. In some embodiments, the second formation charge rate can be at least about 0.4 C, at least about 0.41 C, at least about 0.42 C, at least about 0.43 C, at least about 0.44 C, at least about 0.45 C, at least about 0.46 C, at least about 0.47 C, at least about 0.48 C, at least about 0.49 C, at least about 0.5 C, at least about 0.51 C, at least about 0.52 C, at least about 0.53 C, at least about 0.54 C, at least about 0.55 C, at least about 0.56 C, at least about 0.57 C, at least about 0.58 C, or at least about 0.59 C. In some embodiments, the second formation charge rate can be no more than about 0.6 C, no more than about 0.59 C, no more than about 0.58 C, no more than about 0.57 C, no more than about 0.56 C, no more than about 0.56 C, no more than about 0.55 C, no more than about 0.54 C, no more than about 0.53 C, no more than about 0.52 C, no more than about 0.51 C, no more than about 0.5 C, no more than about 0.49 C, no more than about 0.48 C, no more than about 0.47 C, no more than about 0.46 C, no more than about 0.45 C, no more than about 0.44 C, no more than about 0.43 C, no more than about 0.42 C, or no more than about 0.41 C. Combinations of the above-referenced charge rates are also possible (e.g., at least about 0.4 C and no more than about 0.6 C or at least about 0.45 C and no more than about 0.55 C), inclusive of all values and ranges therebetween. In some embodiments, the second formation charge rate can be about 0.4 C, about 0.41 C, about 0.42 C, about 0.43 C, about 0.44 C, about 0.45 C, about 0.46 C, about 0.47 C, about 0.48 C, about 0.49 C, about 0.5 C, about 0.51 C, about 0.52 C, about 0.53 C, about 0.54 C, about 0.55 C, about 0.56 C, about 0.57 C, about 0.58 C, about 0.59 C, or about 0.6 C.

In some embodiments, the battery can be charged at the second formation charge rate to reach a voltage of at least about $0.95 \times V_{max}$, at least about $0.955 \times V_{max}$, at least about $0.96 \times V_{max}$, at least about $0.965 \times V_{max}$, at least about $0.97 \times V_{max}$, or at least about $0.975 \times V_{max}$. In some embodiments, the battery can be charged at the second formation charge rate to reach a voltage of no more than about $0.98 \times V_{max}$, no more than about $0.975 \times V_{max}$, no more than about $0.97 \times$ $V_{max}$, no more than about $0.965 \times V_{max}$, no more than about $0.96 \times V_{max}$, or no more than about $0.955 \times V_{max}$. Combinations of the above-referenced voltages are also possible (e.g., at least about $0.95 \times V_{max}$ and no more than about $0.98 \times V_{max}$ or at least about $0.96 \times V_{max}$ and no more than about $0.97 \times V_{max}$), inclusive of all values and ranges therebetween. In some embodiments, the battery can be charged at the second formation charge rate to reach a voltage of about $0.95 \times V_{max}$, about $0.955 \times V_{max}$, about $0.96 \times V_{max}$, about $0.965 \times V_{max}$, about $0.97 \times V_{max}$, about $0.975 \times V_{max}$, or about $0.98 \times V_{max}$.

In some embodiments, the second formation charge can include a constant voltage charge with any of the above-referenced voltages as the constant voltage and a cutoff current. In some embodiments, the cutoff current can be at least about 0.03 C, at least about 0.035 C, at least about 0.04 C, at least about 0.045 C, at least about 0.05 C, at least about 0.055 C, at least about 0.06 C, or at least about 0.065 C. In some embodiments, the cutoff current can be no more than about 0.07 C, no more than about 0.065 C, no more than about 0.06 C, no more than about 0.055 C, no more than about 0.05 C, no more than about 0.045 C, no more than about 0.04 C, or no more than about 0.035 C. Combinations of the above-referenced cutoff currents are also possible (e.g., at least about 0.03 C and no more than about 0.07 C or at least about 0.04 C and no more than about 0.06 C), inclusive of all values and ranges therebetween.

In some embodiments, the second formation charge rate can be applied for at least about 30 minutes, at least about 40 minutes, at least about 50 minutes, at least about 1 hour, at least about 1.5 hours, at least about 2 hours, or at least about 2.5 hours. In some embodiments, the second formation charge rate can be applied for no more than about 3 hours, no more than about 2.5 hours, no more than about 2 hours, no more than about 1.5 hours, no more than about 1 hour, no more than about 50 minutes, or no more than about 40 minutes. Combinations of the above-referenced durations of the second formation charge are also possible (e.g., at least about 30 minutes and no more than about 3 hours or at least about 1 hour and no more than about 2 hours), inclusive of all values and ranges therebetween. In some embodiments, the second formation charge rate can be applied for about 30 minutes, about 40 minutes, about 50 minutes, about 1 hour, about 1.5 hours, about 2 hours, about 2.5 hours, or about 3 hours.

Step 18 includes discharging the battery at a second formation discharge rate. In some embodiments, the battery can be discharged at the second formation discharge rate to a voltage of at least about $0.6 \times V_{max}$, at least about $0.61 \times V_{max}$, at least about $0.62 \times V_{max}$, at least about $0.63 \times V_{max}$, at least about $0.64 \times V_{max}$, at least about $0.65 \times V_{max}$, at least about $0.66 \times V_{max}$, at least about $0.67 \times V_{max}$, at least about $0.68 \times V_{max}$, or at least about $0.69 \times V_{max}$. In some embodiments, the battery can be discharged at the second formation discharge rate to a voltage of no more than about $0.70 \times V_{max}$, no more than about $0.69 \times V_{max}$, no more than about $0.68 \times V_{max}$, no more than about $0.67 \times V_{max}$, no more than about $0.66 \times V_{max}$, no more than about $0.65 \times V_{max}$, no more than about $0.64 \times V_{max}$, no more than about $0.63 \times V_{max}$, no more than about $0.62 \times V_{max}$, or no more than about $0.61 \times V_{max}$. Combinations of the above-referenced voltages are also possible (e.g., at least about $0.6 \times V_{max}$ and no more than about $0.7 \times V_{max}$ or at least about $0.62 \times V_{max}$ and no more than about $0.67 \times V_{max}$), inclusive of all values and ranges therebetween. In some embodiments, the battery can be discharged at the first formation discharge rate to a voltage of about $0.6 \times V_{max}$, about $0.61 \times V_{max}$, about $0.62 \times V_{max}$, about $0.63 \times V_{max}$, about $0.64 \times V_{max}$, about $0.65 \times V_{max}$, about $0.66 \times V_{max}$, about $0.67 \times V_{max}$, about $0.68 \times V_{max}$, about $0.69 \times V_{max}$, or about $0.7 \times V_{max}$. Keeping the cell voltage above $0.6 \times V_{max}$ throughout the cell lifetime can result in improved cycle life, as deeper discharges during formation can be detrimental to cycle life.

In some embodiments, the second formation discharge rate can be at least about 0.4 C, at least about 0.41 C, at least about 0.42 C, at least about 0.43 C, at least about 0.44 C, at least about 0.45 C, at least about 0.46 C, at least about 0.47 C, at least about 0.48 C, at least about 0.49 C, at least about 0.5 C, at least about 0.51 C, at least about 0.52 C, at least about 0.53 C, at least about 0.54 C, at least about 0.55 C, at least about 0.56 C, at least about 0.57 C, at least about 0.58 C, or at least about 0.59 C. In some embodiments, the first formation discharge rate can be no more than about 0.6 C, no more than about 0.59 C, no more than about 0.58 C, no more than about 0.57 C, no more than about 0.56 C, no more than about 0.55 C, no more than about 0.54 C, no more than about 0.53 C, no more than about 0.52 C, no more than about 0.51 C, no more than about 0.5 C, no more than about 0.49 C, no more than about 0.48 C, no more than about 0.47 C, no more than about 0.46 C, no more than about 0.45 C, no more than about 0.44 C, no more than about 0.43 C, no more than about 0.42 C, or no more than about 0.41 C. Combinations of the above-referenced discharge rates are also possible (e.g., at least about 0.4 C and no more than about 0.6 C or at least about 0.45 C and no more than about 0.55 C), inclusive of all values and ranges therebetween. In some embodiments, the first formation discharge rate can be about 0.4 C, about 0.41 C, about 0.42 C, about 0.43 C, about 0.44 C, about 0.45 C, about 0.46 C, about 0.47 C, about 0.48 C, about 0.49 C, about 0.5 C, about 0.51 C, about 0.52 C, about 0.53 C, about 0.54 C, about 0.55 C, about 0.56 C, about 0.57 C, about 0.58 C, about 0.59 C, or about 0.6 C.

In some embodiments, the second formation discharge rate can be applied for at least about 30 minutes, at least about 40 minutes, at least about 50 minutes, at least about 1 hour, at least about 1.5 hours, at least about 2 hours, or at least about 2.5 hours. In some embodiments, the second formation discharge rate can be applied for no more than about 3 hours, no more than about 2.5 hours, no more than about 2 hours, no more than about 1.5 hours, no more than about 1 hour, no more than about 50 minutes, or no more than about 40 minutes. Combinations of the above-referenced durations of the second formation charge are also possible (e.g., at least about 30 minutes and no more than about 3 hours or at least about 1 hour and no more than about 2 hours), inclusive of all values and ranges therebetween. In some embodiments, the second formation discharge rate can be applied for about 30 minutes, about 40 minutes, about 50 minutes, about 1 hour, about 1.5 hours, about 2 hours, about 2.5 hours, or about 3 hours.

Step 19 is optional and includes allowing the battery to rest for a third resting period. In some embodiments, the method 10 can include the third resting period (at step 19) but exclude the second resting period (at step 16). In some embodiments, the third resting period can be at least about 30 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, or at least about 11 hours. In some embodiments, the third resting period can be no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, no more than about 2 hours, or no more than about 1 hour. Combinations of the above-referenced durations of the third resting period are also possible (e.g., at least about 30 minutes and no more than about 1.5 hours or at least about 40 minutes and no more than about 1.5 hours), inclusive of all values and ranges therebetween. In some embodiments, the third resting period can be about 30 minutes, about 1 hour, about 2 hours, about 3 hours, about 4 hours, about 5 hours, about 6 hours, about 7 hours, about 8 hours, about 9 hours, about 10 hours, about 11 hours, or about 12 hours.

In some embodiments, the third resting period can be at room temperature. In some embodiments, the third resting period can be at a temperature of at least about 10° C., at least about 11° C., at least about 12° C., at least about 13° C., at least about 14° C., at least about 15° C., at least about 16° C., at least about 17° C., at least about 18° C., at least about 19° C., at least about 20° C., at least about 21° C., at least about 22° C., at least about 23° C., at least about 24° C., at least about 25° C., at least about 26° C., at least about 27° C., at least about 28° C., or at least about 29° C. In some embodiments, the third resting period can be at a temperature of no more than about 30° C., no more than about 29° C., no more than about 28° C., no more than about 27° C., no more than about 26° C., no more than about 25° C., no more than about 24° C., no more than about 23° C., no more than about 22° C., no more than about 21° C., no more than about 20° C., no more than about 19° C., no more than about 18° C., no more than about 17° C., no more than about 16° C., no more than about 15° C., no more than about 14° C., no more than about 13° C., no more than about 12° C., or no more than about 11° C. Combinations of the above-referenced temperatures are also possible (e.g., at least about 10° C. and no more than about 30° C. or at least about 15° C. and no more than about 25° C.), inclusive of all values and ranges therebetween. In some embodiments, the third resting period can be at a temperature of about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

Step 20 includes applying a charge to the battery at a third formation charge rate. In some embodiments, the third formation charge rate can be at least about 0.4 C, at least about 0.41 C, at least about 0.42 C, at least about 0.43 C, at least about 0.44 C, at least about 0.45 C, at least about 0.46 C, at least about 0.47 C, at least about 0.48 C, at least about 0.49 C, at least about 0.5 C, at least about 0.51 C, at least about 0.52 C, at least about 0.53 C, at least about 0.54 C, at least about 0.55 C, at least about 0.56 C, at least about 0.57 C, at least about 0.58 C, or at least about 0.59 C. In some embodiments, the third formation charge rate can be no more than about 0.6 C, no more than about 0.59 C, no more than about 0.58 C, no more than about 0.57 C, no more than about 0.56 C, no more than about 0.55 C, no more than about 0.54 C, no more than about 0.53 C, no more than about 0.52 C, no more than about 0.51 C, no more than about 0.5 C, no more than about 0.49 C, no more than about 0.48 C, no more than about 0.47 C, no more than about 0.46 C, no more than about 0.45 C, no more than about 0.44 C, no more than about 0.43 C, no more than about 0.42 C, or no more than about 0.41 C. Combinations of the above-referenced charge rates are also possible (e.g., at least about 0.4 C and no more than about 0.6 C or at least about 0.45 C and no more than about 0.55 C), inclusive of all values and ranges therebetween. In some embodiments, the third formation charge rate can be about 0.4 C, about 0.41 C, about 0.42 C, about 0.43 C, about 0.44 C, about 0.45 C, about 0.46 C, about 0.47 C, about 0.48 C, about 0.49 C, about 0.5 C, about 0.51 C, about 0.52 C, about 0.53 C, about 0.54 C, about 0.55 C, about 0.56 C, about 0.57 C, about 0.58 C, about 0.59 C, or about 0.6 C. In some embodiments, the third formation charge rate can be greater than the second formation charge rate. In some embodiments, the third formation charge rate can be equal to or substantially similar to the second formation charge rate.

In some embodiments, the third formation charge rate can be applied for at least about 5 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, or at least about 55 minutes. In some embodiments, the third formation charge rate can be applied for no more than about 1 hour, no more than about 55 minutes, no more than about 50 minutes, no more than about 45 minutes, no more than about 40 minutes, no more than about 35 minutes, no more than about 30 minutes, no more than about 25 minutes, no more than about 20 minutes, no more than about 15 minutes, or no more than about 10 minutes. Combinations of the above-referenced durations of the third formation charge are also possible (e.g., at least about 5 minutes and no more than about 1 hour or at least about 20 minutes and no more than about 40 minutes), inclusive of all values and ranges therebetween. In some embodiments, the second formation charge rate can be applied for about 5 minutes, about 10 minutes, about 15 minutes, about 20 minutes, about 25 minutes, about 30 minutes, about 35 minutes, about 40 minutes, about 45 minutes, about 50 minutes, about 55 minutes, or about 1 hour.

In some embodiments, the third formation charge rate can be applied until the battery reaches an SOC of at least about 20%, at least about 21%, at least about 22%, at least about 23%, at least about 24%, at least about 25%, at least about 26%, at least about 27%, at least about 28%, at least about 29%. In some embodiments, the third formation charge rate can be applied until the battery reaches a SOC of no more than about 30%, no more than about 29%, no more than about 28%, no more than about 27%, no more than about 26%, no more than about 25%, no more than about 24%, no more than about 23%, no more than about 22%, or no more than about 21%. Combinations of the above-referenced SOC's are also possible (e.g., at least about 20% and no more than about 30% or at least about 22% and no more than about 28%), inclusive of all values and ranges therebetween. In some embodiments, the third formation charge rate can be applied until the battery reaches a SOC of about 20%, about 21%, about 22%, about 23%, about 24%, about 25%, about 26%, about 27%, about 28%, about 29%, or about 30%.

FIG. 2 is a flow diagram of a method 30 of producing a secondary battery, according to an embodiment. As shown, the method 30 optionally includes combining an anode, a cathode, and a separator at step 31 to form a battery. The method 30 includes applying a charge to the battery at an initial charge rate at step 32, allowing the battery to rest for a first resting period at step 33, applying a charge to the battery at a first formation charge rate at step 34, and discharging the battery at the first formation discharge rate at step 35. The method 30 optionally includes allowing the battery to rest for a second resting period at step 36. The method 30 further includes applying a charge to the battery at a second formation charge rate at step 37 and discharging the battery at a second formation discharge rate at step 38.

The method 30 further includes applying a charge to the battery at a third formation charge rate at step 39.

In some embodiments, step 31 and step 32 can be the same or substantially similar to step 11 and step 12, respectively, as described above with respect to FIG. 1. Thus, certain aspects of step 31 and step 32 are not described in greater detail herein. Step 32 includes a tap charge of the battery. In some embodiments, the tap charge can be at a rate of at least about 0.01 C, at least about 0.02 C, at least about 0.03 C, at least about 0.04 C, at least about 0.05 C, at least about 0.06 C, at least about 0.07 C, at least about 0.08 C, or at least about 0.09 C. In some embodiments, the tap charge can be at a rate of no more than about 0.1 C, no more than about 0.09 C, no more than about 0.08 C, no more than about 0.07 C, no more than about 0.06 C, no more than about 0.05 C, no more than about 0.04 C, no more than about 0.03 C, or no more than about 0.02 C. Combinations of the above-referenced tap charge rates are also possible (e.g., at least about 0.01 C and no more than about 0.1 C or at least about 0.04 C and no more than about 0.06 C), inclusive of all values and ranges therebetween. In some embodiments, the tap charge rate can be about 0.01 C, about 0.02 C, about 0.03 C, about 0.04 C, about 0.05 C, about 0.06 C, about 0.07 C, about 0.08 C, about 0.09 C, or about 0.1 C.

In some embodiments, the tap charge at step 32 can bring the battery to a voltage of at least about $0.9 \times V_{max}$, at least about $0.91 \times V_{max}$, at least about $0.92 \times V_{max}$, at least about $0.93 \times V_{max}$, at least about $0.94 \times V_{max}$, at least about $0.95 \times V_{max}$, at least about $0.96 \times V_{max}$, at least about $0.97 \times V_{max}$, at least about $0.98 \times V_{max}$, or at least about $0.99 \times V_{max}$. In some embodiments, the tap charge at step 32 can bring the battery to a voltage of no more than about $V_{max}$, no more than about $0.99 \times V_{max}$, no more than about $0.98 \times V_{max}$, no more than about $0.97 \times V_{max}$, no more than about $0.96 \times V_{max}$, no more than about $0.95 \times V_{max}$, no more than about $0.94 \times V_{max}$, no more than about $0.93 \times V_{max}$, no more than about $0.92 \times V_{max}$, or no more than about $0.91 \times V_{max}$. Combinations of the above-referenced tap charge values are also possible (e.g., at least about $0.9 \times V_{max}$ and no more than $1 \times V_{max}$ or at least about $0.92 \times V_{max}$ and no more than about $0.95 \times V_{max}$), inclusive of all values and ranges therebetween. In some embodiments, the tap charge at step 32 can bring the battery to a voltage of about $0.9 \times V_{max}$, about $0.91 \times V_{max}$, about $0.92 \times V_{max}$, about $0.93 \times V_{max}$, about $0.94 \times V_{max}$, about $0.95 \times V_{max}$, about $0.96 \times V_{max}$, about $0.97 \times V_{max}$, about $0.98 \times V_{max}$, about $0.99 \times V_{max}$, or about $1 \times V_{max}$.

Step 33 includes allowing the battery to rest for a first resting period. In some embodiments, step 33 can be the same or substantially similar to step 13, as described above with reference to FIG. 1. Thus, certain aspects of step 33 are not described in greater detail herein. In some embodiments, the first resting period can be at least about 0.5 hours, at least about 1 hours, at least about 1.5 hours, at least about 2 hours, at least about 2.5 hours, at least about 3 hours, at least about 3.5 hours, at least about 4 hours, or at least about 4.5 hours. In some embodiments, the first resting period can be no more than about 5 hours, no more than about 4.5 hours, no more than about 4 hours, no more than about 3.5 hours, no more than about 3 hours, no more than about 2.5 hours, no more than about 2 hours, no more than about 1.5 hours, or no more than about 1 hour. Combinations of the above-referenced durations of the first resting period are also possible (e.g., at least about 0.5 hours and no more than about 5 hours or at least about 1.5 hours and no more than about 2.5 hours), inclusive of all values and ranges therebetween. In some embodiments, the first resting period can be about 0.5 hours, about 1 hours, about 1.5 hours, about 2 hours, about 2.5 hours, about 3 hours, about 3.5 hours, about 4 hours, about 4.5 hours, or about 5 hours.

Step 34 includes a first formation charge. In some embodiments, step 34 can be the same or substantially similar to step 14, as described above with reference to FIG. 1. Thus, certain aspects of FIG. 1 are not described in greater detail herein. In some embodiments, the first formation charge can be at a rate of at least about 0.05 C, at least about 0.06 C, at least about 0.07 C, at least about 0.08 C, at least about 0.09 C, at least about 0.1 C, at least about 0.11 C, at least about 0.12 C, at least about 0.13 C, or at least about 0.14 C. In some embodiments, the first formation charge can be at a rate of no more than about 0.15 C, no more than about 0.14 C, no more than about 0.13 C, no more than about 0.12 C, no more than about 0.11 C, no more than about 0.1 C, no more than about 0.09 C, no more than about 0.08 C, no more than about 0.07 C, or no more than about 0.06 C. Combinations of the above-referenced charge rates are also possible (e.g., at least about 0.05 C and no more than about 0.15 C or at least about 0.07 C and no more than about 0.12 C), inclusive of all values and ranges therebetween. In some embodiments, the first formation charge can be at a rate of about 0.05 C, about 0.06 C, about 0.07 C, about 0.08 C, about 0.09 C, about 0.1 C, about 0.11 C, about 0.12 C, about 0.13 C, about 0.14 C, or about 0.15 C. In some embodiments, the first formation charge can be at an ascending rate. In other words, the battery can be charged at a rate increasing from a first charge rate to a second charge rate until the battery reaches the desired voltage. The first charge rate and the second charge rate can include any of the charge rates noted above.

In some embodiments, the first formation charge at step 34 can bring the battery to a voltage of at least about $0.9 \times V_{max}$, at least about $0.91 \times V_{max}$, at least about $0.92 \times V_{max}$, at least about $0.93 \times V_{max}$, at least about $0.94 \times V_{max}$, at least about $0.95 \times V_{max}$, at least about $0.96 \times V_{max}$, at least about $0.97 \times V_{max}$, at least about $0.98 \times V_{max}$, or at least about $0.99 \times V_{max}$. In some embodiments, the first formation charge at step 34 can bring the battery to a voltage of no more than about $V_{max}$, no more than about $0.99 \times V_{max}$, no more than about $0.98 \times V_{max}$, no more than about $0.97 \times V_{max}$, no more than about $0.96 \times V_{max}$, no more than about $0.95 \times V_{max}$, no more than about $0.94 \times V_{max}$, no more than about $0.93 \times V_{max}$, no more than about $0.92 \times V_{max}$, or no more than about $0.91 \times V_{max}$. Combinations of the above-referenced tap charge values are also possible (e.g., at least about $0.9 \times V_{max}$ and no more than $1 \times V_{max}$ or at least about $0.92 \times V_{max}$ and no more than about $0.95 \times V_{max}$), inclusive of all values and ranges therebetween. In some embodiments, the first formation charge at step 34 can bring the battery to a voltage of about $0.9 \times V_{max}$, about $0.91 \times V_{max}$, about $0.92 \times V_{max}$, about $0.93 \times V_{max}$, about $0.94 \times V_{max}$, about $0.95 \times V_{max}$, about $0.96 \times V_{max}$, about $0.97 \times V_{max}$, about $0.98 \times V_{max}$, about $0.99 \times V_{max}$, or about $1 \times V_{max}$.

Step 35 includes a first formation discharge. In some embodiments, step 35 can be the same or substantially similar to step 15, as described above with reference to FIG. 1. Thus, certain aspects of step 35 are not described in greater detail herein. In some embodiments, the first formation discharge can be at a rate of at least about 0.05 C, at least about 0.06 C, at least about 0.07 C, at least about 0.08 C, at least about 0.09 C, at least about 0.1 C, at least about 0.11 C, at least about 0.12 C, at least about 0.13 C, or at least about 0.14 C. In some embodiments, the first formation discharge can be at a rate of no more than about 0.15 C, no more than about 0.14 C, no more than about 0.13 C, no more than about 0.12 C, no more than about 0.11 C, no more than about 0.1 C, no more than about 0.09 C, no more than about 0.08 C, no more than about 0.07 C, or no more than about 0.06 C. Combinations of the above-referenced discharge rates are also possible (e.g., at least about 0.05 C and no more than about 0.15 C or at least about 0.07 C and no more than about 0.12 C), inclusive of all values and ranges therebetween. In some embodiments, the first formation discharge can be at a rate of about 0.05 C, about 0.06 C, about 0.07 C, about 0.08 C, about 0.09 C, about 0.1 C, about 0.11 C, about 0.12 C, about 0.13 C, about 0.14 C, or about 0.15 C.

In some embodiments, the first formation discharge can be to a voltage of at least about $0.75 \times V_{max}$, at least about $0.76 \times V_{max}$, at least about $0.77 \times V_{max}$, at least about $0.78 \times V_{max}$, at least about $0.79 \times V_{max}$, at least about $0.8 \times V_{max}$, at least about $0.81 \times V_{max}$, at least about $0.82 \times V_{max}$, at least about $0.83 \times V_{max}$, at least about $0.84 \times V_{max}$, at least about $0.85 \times V_{max}$, at least about $0.86 \times V_{max}$, at least about $0.87 \times V_{max}$, at least about $0.88 \times V_{max}$, or at least about $0.89 \times V_{max}$. In some embodiments, the first formation discharge can be to a voltage of no more than about $0.9 \times V_{max}$, no more than about $0.89 \times V_{max}$, no more than about $0.88 \times V_{max}$, no more than about $0.87 \times V_{max}$, no more than about $0.86 \times V_{max}$, no more than about $0.85 \times V_{max}$, no more than about $0.84 \times V_{max}$, no more than about $0.83 \times V_{max}$, no more than about $0.82 \times V_{max}$, no more than about $0.81 \times V_{max}$, no more than about $0.8 \times V_{max}$, no more than about $0.79 \times V_{max}$, no more than about $0.78 \times V_{max}$, no more than about $0.77 \times V_{max}$, or no more than about $0.76 \times V_{max}$. Combinations of the above-referenced voltages are also possible (e.g., at least about $0.75 \times V_{max}$ and no more than about $0.9 \times V_{max}$ or at least about $0.8 \times V_{max}$ and no more than about $0.85 \times V_{max}$), inclusive of all values and ranges therebetween. In some embodiments, the first formation discharge can be to a voltage of about $0.75 \times V_{max}$, about $0.76 \times V_{max}$, about $0.77 \times V_{max}$, about $0.78 \times V_{max}$, about $0.79 \times V_{max}$, about $0.8 \times V_{max}$, about $0.81 \times V_{max}$, about $0.82 \times V_{max}$, about $0.83 \times V_{max}$, about $0.84 \times V_{max}$, about $0.85 \times V_{max}$, about $0.86 \times V_{max}$, about $0.87 \times V_{max}$, about $0.88 \times V_{max}$, about $0.89 \times V_{max}$, or about $0.9 \times V_{max}$.

Step 36 includes a second resting period. In some embodiments, step 36 can be the same or substantially similar to step 16, as described above with reference to FIG. 1. Thus, certain aspects of step 36 are not described in greater detail herein. In some embodiments, the second resting period can be at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, at least about 15 hours, at least about 16 hours, at least about 17 hours, at least about 18 hours, or at least about 19 hours. In some embodiments, the second resting period can be no more than about 20 hours, no more than about 19 hours, no more than about 18 hours, no more than about 17 hours, no more than about 16 hours, no more than about 15 hours, no more than about 14 hours, no more than about 13 hours, no more than about 12 hours, no more than about 11 hours, no more than about 10 hours, no more than about 9 hours, no more than about 8 hours, no more than about 7 hours, no more than about 6 hours, no more than about 5 hours, no more than about 4 hours, no more than about 3 hours, or no more than about 2 hours. Combinations of the above-referenced durations are also possible (e.g., at least about 1 hour and no more than about 20 hours or at least about 4 hours and no more than about 16 hours), inclusive of all values and ranges therebetween. In some embodiments, step 36 can have a duration of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, or about 20 hours.

Step 37 includes a second formation charge. In some embodiments, step 37 can be the same or substantially similar to step 17, as described above with respect to FIG. 1. Thus, certain aspects of step 37 are not described in greater detail herein. In some embodiments, the second formation charge can include charging at two different rates. Specifically, the second formation charge can include charging at a first rate until reaching a desired voltage and charging at a constant voltage until the charge rate is at a second rate. In some embodiments, the second formation charge can include a first charge rate of at least about 0.05 C, at least about 0.06 C, at least about 0.07 C, at least about 0.08 C, at least about 0.09 C, at least about 0.1 C, at least about 0.11 C, at least about 0.12 C, at least about 0.13 C, or at least about 0.14 C. In some embodiments, the second formation charge can include a first charge rate of no more than about 0.15 C, no more than about 0.14 C, no more than about 0.13 C, no more than about 0.12 C, no more than about 0.11 C, no more than about 0.1 C, no more than about 0.09 C, no more than about 0.08 C, no more than about 0.07 C, or no more than about 0.06 C. Combinations of the above-referenced charge rates are also possible (e.g., at least about 0.05 C and no more than about 0.15 C or at least about 0.07 C and no more than about 0.12 C), inclusive of all values and ranges therebetween. In some embodiments, the second formation charge can be include a first charge rate of about 0.05 C, about 0.06 C, about 0.07 C, about 0.08 C, about 0.09 C, about 0.1 C, about 0.11 C, about 0.12 C, about 0.13 C, about 0.14 C, or about 0.15 C.

In some embodiments, the second formation charge can charge the battery at the first rate until the battery reaches a voltage of at least about $0.95 \times V_{max}$, at least about $0.96 \times V_{max}$, at least about $0.97 \times V_{max}$, or at least about $0.98 \times V_{max}$. In some embodiments, the second formation charge can charge the battery at the first rate until the battery reaches a voltage of no more than about $0.99 \times V_{max}$, no more than about $0.98 \times V_{max}$, no more than about $0.97 \times V_{max}$, or no more than about $0.96 \times V_{max}$. Combinations of the above-referenced voltages are also possible (e.g., at least about $0.95 \times V_{max}$ and no more than about $0.99 \times V_{max}$ or at least about $0.96 \times V_{max}$ and no more than about $0.98 \times V_{max}$), inclusive of all values and ranges therebetween. In some embodiments, the second formation charge can charge the battery at the first rate until the battery reaches a voltage of about $0.95 \times V_{max}$, about $0.96 \times V_{max}$, about $0.97 \times V_{max}$, about $0.98 \times V_{max}$, or about $0.99 \times V_{max}$.

In some embodiments, the second formation charge can include charging at constant voltage until the current of the charge reaches a second rate. In some embodiments, the second rate can be at least about 0.03 C, at least about 0.035 C, at least about 0.04 C, at least about 0.045 C, at least about 0.05 C, at least about 0.055 C, at least about 0.06 C, or at least about 0.065 C. In some embodiments, the second rate can be no more than about 0.07 C, no more than about 0.065 C, no more than about 0.06 C, no more than about 0.055 C, no more than about 0.05 C, no more than about 0.045 C, no more than about 0.04 C, or no more than about 0.035 C. Combinations of the above-referenced rates are also possible (e.g., at least about 0.03 C and no more than about 0.07 C or at least about 0.04 C and no more than about 0.06 C), inclusive of all values and ranges therebetween. In some embodiments, the second rate can be about 0.03 C, about 0.035 C, about 0.04 C, about 0.045 C, about 0.05 C, about 0.055 C, about 0.06 C, about 0.065 C, or about 0.07 C.

Step 38 includes a second formation discharge. In some embodiments, step 38 can be the same or substantially similar to step 18, as described above with reference to FIG. 1. Thus, certain aspects of step 38 are not described in greater detail herein. In some embodiments, the second formation discharge can be at a rate of at least about 0.03 C, at least about 0.035 C, at least about 0.04 C, at least about 0.045 C, at least about 0.05 C, at least about 0.055 C, at least about 0.06 C, or at least about 0.065 C. In some embodiments, the second formation discharge can be at a rate of no more than about 0.07 C, no more than about 0.065 C, no more than about 0.06 C, no more than about 0.055 C, no more than about 0.05 C, no more than about 0.045 C, no more than about 0.04 C, or no more than about 0.035 C. Combinations of the above-referenced rates are also possible (e.g., at least about 0.03 C and no more than about 0.07 C or at least about 0.04 C and no more than about 0.06 C), inclusive of all values and ranges therebetween. In some embodiments, the second formation discharge can be at a rate of about 0.03 C, about 0.035 C, about 0.04 C, about 0.045 C, about 0.05 C, about 0.055 C, about 0.06 C, about 0.065 C, or about 0.07 C.

In some embodiments, the second formation discharge can be to a voltage of at least about $0.6 \times V_{max}$, at least about $0.61 \times V_{max}$, at least about $0.62 \times V_{max}$, at least about $0.63 \times V_{max}$, at least about $0.64 \times V_{max}$, at least about $0.65 \times V_{max}$, at least about $0.66 \times V_{max}$, at least about $0.67 \times V_{max}$, at least about $0.68 \times V_{max}$, at least about $0.69 \times V_{max}$, at least about $0.7 \times V_{max}$, at least about $0.71 \times V_{max}$, at least about $0.72 \times V_{max}$, at least about $0.73 \times V_{max}$, at least about $0.74 \times V_{max}$, at least about $0.75 \times V_{max}$, at least about $0.76 \times V_{max}$, at least about $0.77 \times V_{max}$, at least about $0.78 \times V_{max}$, or at least about $0.79 \times V_{max}$. In some embodiments, the second formation discharge can be to a voltage of no more than about $0.8 \times V_{max}$, no more than about $0.79 \times V_{max}$, no more than about $0.78 \times V_{max}$, no more than about $0.77 \times V_{max}$, no more than about $0.76 \times V_{max}$, no more than about $0.75 \times V_{max}$, no more than about $0.74 \times V_{max}$, no more than about $0.73 \times V_{max}$, no more than about $0.72 \times V_{max}$, no more than about $0.71 \times V_{max}$, no more than about $0.7 \times V_{max}$, no more than about $0.69 \times V_{max}$, no more than about $0.68 \times V_{max}$, no more than about $0.67 \times V_{max}$, no more than about $0.66 \times V_{max}$, no more than about $0.65 \times V_{max}$, no more than about $0.64 \times V_{max}$, no more than about $0.63 \times V_{max}$, no more than about $0.62 \times V_{max}$, or no more than about $0.61 \times V_{max}$. Combinations of the above-referenced voltages are also possible (e.g., at least about $0.6 \times V_{max}$ and no more than about $0.8 \times V_{max}$ or at least about $0.65 \times V_{max}$ and no more than about $0.75 \times V_{max}$), inclusive of all values and ranges therebetween. In some embodiments, the second formation discharge can be to a voltage of about $0.6 \times V_{max}$, about $0.61 \times V_{max}$, about $0.62 \times V_{max}$, about $0.63 \times V_{max}$, about $0.64 \times V_{max}$, about $0.65 \times V_{max}$, about $0.66 \times V_{max}$, about $0.67 \times V_{max}$, about $0.68 \times V_{max}$, about $0.69 \times V_{max}$, about $0.7 \times V_{max}$, about $0.71 \times V_{max}$, about $0.72 \times V_{max}$, about $0.73 \times V_{max}$, about $0.74 \times V_{max}$, about $0.75 \times V_{max}$, about $0.76 \times V_{max}$, about $0.77 \times V_{max}$, about $0.78 \times V_{max}$, about $0.79 \times V_{max}$, or about $0.8 \times V_{max}$.

In some embodiments, step 37 and step 38 can be repeated a total of 2 times, 3 times, 4 times, or 5 times. The number of iterations of step 37 and step 38 can depend on cell chemistry and electrode design.

Step 39 includes a third formation charge. In some embodiments, step 39 can be the same or substantially similar to step 20, as described above with reference to FIG. 1. Thus, certain aspects of step 39 are not described in greater detail herein. In some embodiments, the third formation charge can be at a rate of at least about 0.4 C, at least about 0.41 C, at least about 0.42 C, at least about 0.43 C, at least about 0.44 C, at least about 0.45 C, at least about 0.46 C, at least about 0.47 C, at least about 0.48 C, at least about 0.49 C, at least about 0.5 C, at least about 0.51 C, at least about 0.52 C, at least about 0.53 C, at least about 0.54 C, at least about 0.55 C, at least about 0.56 C, at least about 0.57 C, at least about 0.58 C, or at least about 0.59 C. In some embodiments, the third formation charge can be at a rate of no more than about 0.6 C, no more than about 0.59 C, no more than about 0.58 C, no more than about 0.57 C, no more than about 0.56 C, no more than about 0.55 C, no more than about 0.54 C, no more than about 0.53 C, no more than about 0.52 C, no more than about 0.51 C, no more than about 0.5 C, no more than about 0.49 C, no more than about 0.48 C, no more than about 0.47 C, no more than about 0.46 C, no more than about 0.45 C, no more than about 0.44 C, no more than about 0.43 C, no more than about 0.42 C, or no more than about 0.41 C. Combinations of the above-referenced charge rates are also possible (e.g., at least about 0.4 C and no more than about 0.6 C or at least about 0.45 C and no more than about 0.55 C), inclusive of all values and ranges therebetween. In some embodiments, the third formation charge can be at a rate of about 0.4 C, about 0.41 C, about 0.42 C, about 0.43 C, about 0.44 C, about 0.45 C, about 0.46 C, about 0.47 C, about 0.48 C, about 0.49 C, about 0.5 C, about 0.51 C, about 0.52 C, about 0.53 C, about 0.54 C, about 0.55 C, about 0.56 C, about 0.57 C, about 0.58 C, about 0.59 C, or about 0.6 C.

In some embodiments, the third formation charge can be at constant current. In some embodiments, the third formation charge can be to a designated SOC. In some embodiments, the third formation charge can be to a SOC of at least about 30%, at least about 31%, at least about 32%, at least about 33%, at least about 34%, at least about 35%, at least about 36%, at least about 37%, at least about 38%, or at least about 39%. In some embodiments, the third formation charge can be to a SOC of no more than about 40%, no more than about 39%, no more than about 38%, no more than about 37%, no more than about 36%, no more than about 35%, no more than about 34%, no more than about 33%, no more than about 32%, or no more than about 31%. Combinations of the above-referenced SOC percentages are also possible (e.g., at least about 30% and no more than about 40% or at least about 33% and no more than about 37%), inclusive of all values and ranges therebetween. In some embodiments, the third formation charge can be to a SOC of about 30%, about 31%, about 32%, about 33%, about 34%, about 35%, about 36%, about 37%, about 38%, about 39%, or about 40%.

In some embodiments, the third formation charge can have a duration of at least about 20 minutes, at least about 25 minutes, at least about 30 minutes, at least about 35 minutes, at least about 40 minutes, at least about 45 minutes, at least about 50 minutes, or at least about 55 minutes. In some embodiments, the third formation charge can have a duration of no more than about 60 minutes, no more than about 55 minutes, no more than about 50 minutes, no more than about 45 minutes, no more than about 40 minutes, no more than about 35 minutes, no more than about 30 minutes, or no more than about 25 minutes. Combinations of the above-referenced durations are also possible (e.g., at least about 20 minutes and no more than about 60 minutes or at least about 30 minutes and no more than about 50 minutes), inclusive of all values and ranges therebetween. In some embodiments, the third formation charge can have a duration of about 20 minutes, about 25 minutes, about 30 minutes, about 35 minutes, about 40 minutes, about 45 minutes, about 50 minutes, about 55 minutes, or about 60 minutes.

In some embodiments, any of steps 31-39 can be conducted at a temperature of at least about 15° C., at least about 20° C., at least about 25° C., at least about 30° C., at least about 35° C., at least about 40° C., at least about 45° C., at least about 50° C., at least about 55° C., at least about 60° C., or at least about 65° C. In some embodiments, any of steps 31-39 can be conducted at a temperature of no more than about 70° C., no more than about 65° C., no more than about 60° C., no more than about 55° C., no more than about 50° C., no more than about 45° C., no more than about 40° C., no more than about 35° C., no more than about 30° C., no more than about 25° C., or no more than about 20° C. Combinations of the above-referenced temperatures are also possible (e.g., at least about 15° C. and no more than about 70° C. or at least about 30° C. and no more than about 50° C.), inclusive of all values and ranges therebetween. In some embodiments, any of steps 31-39 can be conducted at a temperature of about 15° C., about 20° C., about 25° C., about 30° C., about 35° C., about 40° C., about 45° C., about 50° C., about 55° C., about 60° C., about 65° C., or about 70° C.

FIG. 3 shows a block diagram of a battery 100, according to an embodiment. As shown, the battery 100 includes an anode 110 with graphene particles 112 and silicon particles 114, a cathode 120 with graphene particles 122, and a separator 130 disposed between the anode 110 and the cathode 120. The particles of the anode 110 can have a stable SEI layer formed around them. In some embodiments, the battery 100 can include a cylindrical battery, a prismatic battery, or a pouch battery. In some embodiments, the battery can include an 18650 lithium-ion rechargeable battery, a 21700 lithium-ion rechargeable battery, a 4680 cylindrical battery, or any combination thereof.

As shown, the anode 110 includes graphene particles 112. In some embodiments, the anode 110 can include graphite active material. In some embodiments, the graphite can include spherical graphite. In some embodiments, the graphite can include synthetic graphite. In some embodiments, the graphene particles 112 can make up at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1 wt %, at least about 2 wt %, at least about 3 wt %, at least about 4 wt %, at least about 5 wt %, at least about 6 wt %, at least about 7 wt %, at least about 8 wt %, or at least about 9 wt % of the anode 110. In some embodiments, the graphene particles 112 can make up no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, no more than about 1 wt %, no more than about 0.9 wt %, no more than about 0.8 wt %, no more than about 0.7 wt %, no more than about 0.6 wt %, no more than about 0.5 wt %, no more than about 0.4 wt %, no more than about 0.3 wt %, or no more than about 0.2 wt % of the anode 110. Combinations of the above-referenced weight percentages are also possible (e.g., at least about 0.1 wt % and no more than about 10 wt % or at least about 0.5 wt % and no more than about 5 wt %), inclusive of all values and ranges therebetween. In some embodiments, the graphene particles 112 can make up about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, or about 10 wt % of the anode 110.

In some embodiments, the graphene particles 112 can include graphene flakes. In some embodiments, the graphene flakes can have any of the physical properties of the graphene flakes described in the '542 patent. In some embodiments, the graphene flakes can have a lateral dimension of at least about 10 nm, at least about 50 nm, at least about 100 nm, at least about 500 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 110 μm, at least about 120 μm, at least about 130 μm, or at least about 140 μm. In some embodiments, the graphene flakes can have a lateral dimension of no more than about 150 μm, no more than about 140 μm, no more than about 130 μm, no more than about 120 μm, no more than about 110 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 5 μm, no more than about 1 μm, no more than about 500 nm, no more than about 100 nm, or no more than about 50 nm. Combinations of the above-referenced lateral dimensions of the graphene flakes are also possible (e.g., at least about 10 nm and no more than about 150 μm or at least about 10 μm and no more than about 100 μm), inclusive of all values and ranges therebetween. In some embodiments, the graphene flakes can have a lateral dimension of about 10 nm, about 50 nm, about 100 nm, about 500 nm, about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, or about 150 μm.

In some embodiments, the graphene flakes can have a thickness of at least about 1 graphene layer, at least about 2 graphene layers, at least about 3 graphene layers, at least about 4 graphene layers, at least about 5 graphene layers, at least about 6 graphene layers, at least about 7 graphene layers, at least about 8 graphene layers, at least about 9 graphene layers, at least about 10 graphene layers, at least about 11 graphene layers, at least about 12 graphene layers, at least about 13 graphene layers, at least about 14 graphene layers, at least about 15 graphene layers, at least about 16 graphene layers, at least about 17 graphene layers, at least about 18 graphene layers, or at least about 19 graphene layers. In some embodiments, the graphene flakes can have a thickness of no more than about 20 graphene layers, no more than about 19 graphene layers, no more than about 18 graphene layers, no more than about 17 graphene layers, no more than about 16 graphene layers, no more than about 15 graphene layers, no more than about 14 graphene layers, no more than about 13 graphene layers, no more than about 12 graphene layers, no more than about 11 graphene layers, no more than about 10 graphene layers, no more than about 9 graphene layers, no more than about 8 graphene layers, no more than about 7 graphene layers, no more than about 6 graphene layers, no more than about 5 graphene layers, no more than about 4 graphene layers, no more than about 3 graphene layers, or no more than about 2 graphene layers.

Combinations of the above-referenced thicknesses of the graphene flakes are also possible (e.g., at least about 1 graphene layer and no more than about 20 graphene layers or at least about 5 graphene layers and no more than about 10 graphene layers), inclusive of all values and ranges therebetween. In some embodiments, the graphene flakes can have a thickness of about 1 graphene layer, about 2 graphene layers, about 3 graphene layers, about 4 graphene layers, about 5 graphene layers, about 6 graphene layers, about 7 graphene layers, about 8 graphene layers, about 9 graphene layers, about 10 graphene layers, about 11 graphene layers, about 12 graphene layers, about 13 graphene layers, about 14 graphene layers, about 15 graphene layers, about 16 graphene layers, about 17 graphene layers, about 18 graphene layers, about 19 graphene layers, or about 20 graphene layers.

In some embodiments, the graphene flakes can have an aspect ratio of at least about 50, at least about 100, at least about 500, at least about 1,000, at least about 5,000, at least about 10,000, at least about 20,000, at least about 30,000, or at least about 40,000. In some embodiments, the graphene flakes can have an aspect ratio of no more than about 50,000, no more than about 40,000, no more than about 30,000, no more than about 20,000, no more than about 10,000, no more than about 5,000, no more than about 1,000, no more than about 500, or no more than about 100. Combinations of the above-referenced aspect ratios are also possible (e.g., at least about 50 and no more than about 50,000 or at least about 500 and no more than about 5,000), inclusive of all values and ranges therebetween. In some embodiments, the graphene flakes can have an aspect ratio of about 50, about 100, about 500, about 1,000, about 5,000, about 10,000, about 20,000, about 30,000, about 40,000, or about 50,000.

As shown, the anode 110 includes silicon particles 114. In some embodiments, the silicon particles 114 can include $SiO_x$ (x=1 or 2), silicon monoxide, silicon dioxide, or any combination thereof. In some embodiments, the silicon particles 114 can make up at least about 0.1 wt %, at least about 0.2 wt %, at least about 0.3 wt %, at least about 0.4 wt %, at least about 0.5 wt %, at least about 0.6 wt %, at least about 0.7 wt %, at least about 0.8 wt %, at least about 0.9 wt %, at least about 1 wt %, at least about 2 wt %, at least about 3 wt %, at least about 4 wt %, at least about 5 wt %, at least about 6 wt %, at least about 7 wt %, at least about 8 wt %, or at least about 9 wt % of the anode 110. In some embodiments, the silicon particles 114 can make up no more than about 10 wt %, no more than about 9 wt %, no more than about 8 wt %, no more than about 7 wt %, no more than about 6 wt %, no more than about 5 wt %, no more than about 4 wt %, no more than about 3 wt %, no more than about 2 wt %, no more than about 1 wt %, no more than about 0.9 wt %, no more than about 0.8 wt %, no more than about 0.7 wt %, no more than about 0.6 wt %, no more than about 0.5 wt %, no more than about 0.4 wt %, no more than about 0.3 wt %, or no more than about 0.2 wt % of the anode 110. Combinations of the above-referenced weight percentages are also possible (e.g., at least about 0.1 wt % and no more than about 10 wt % or at least about 0.5 wt % and no more than about 5 wt %), inclusive of all values and ranges therebetween. In some embodiments, the silicon particles 114 can make up about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, about 9 wt %, or about 10 wt % of the anode 110.

In some embodiments, the anode 110 can include active material that is between about 4 wt % and about 6 wt % silicon monoxide or silicon dioxide, about 1 wt % graphene, and about 93 wt % to about 96 wt % spherical graphite. In some embodiments, the anode 110 can include at least about 85 wt %, at least about 86 wt %, at least about 87 wt %, at least about 88 wt %, at least about 89 wt %, at least about 90 wt %, at least about 91 wt %, at least about 92 wt %, at least about 93 wt %, at least about 94 wt %, at least about 95 wt %, at least about 96 wt %, at least about 97 wt %, at least about 98 wt %, or at least about 99 wt % spherical graphite. In some embodiments, the anode 110 can include no more than about 99.5 wt %, no more than about 99 wt %, no more than about 98 wt %, no more than about 97 wt %, no more than about 96 wt %, no more than about 95 wt %, no more than about 94 wt %, no more than about 93 wt %, no more than about 92 wt %, no more than about 91 wt %, no more than about 90 wt %, no more than about 89 wt %, no more than about 88 wt %, no more than about 87 wt %, or no more than about 86 wt % spherical graphene. Combinations of the above-referenced weight percentages are also possible (e.g., at least about 85 wt % and no more than about 99.5 wt % or at least about 93 wt % and no more than about 97 wt %), inclusive of all values and ranges therebetween. In some embodiments, the anode 110 can include about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, or about 99.5 wt % spherical graphite.

In some embodiments, the cathode 120 can include lithium nickel cobalt aluminum oxides (NCA), nickel manganese cobalt (NMC), NMC 631, NMC 622, NMC 721, NMC 811, NMC 9.5.5, or any combination thereof. In some embodiments, the cathode 120 can include polycrystalline particles. In some embodiments, the cathode 120 can include a single crystal cathode particle. In some embodiments, the cathode 120 can include $LiCoO_2$ (LCO), $LiFePO_4$ (LFP), $LiMn_2O_4$, $LiNi_{0.5}Mn_{1.5}O_4$ (LNMO), nickel-rich layered oxides (spherical secondary agglomerates and/or single-crystal), lithium-rich layered oxides (spherical secondary agglomerates, single-crystal, and/or polycrystalline).

In some embodiments, the lithium salt can have a concentration in the electrolyte of at least about 0.8 M, at least about 0.85 M, at least about 0.9 M, at least about 0.95 M, at least about 1 M, at least about 1.05 M, at least about 1.1 M, or at least about 1.15 M. In some embodiments, the lithium salt can have a concentration in the electrolyte of no more than about 1.2 M, no more than about 1.15 M, no more than about 1.1 M, no more than about 1.05 M, no more than about 1 M, no more than about 0.95 M, no more than about 0.9 M, or no more than about 0.85 M. Combinations of the above-referenced concentrations are also possible (e.g., at least about 0.8 M and no more than about 1.2 M or at least about 0.9 M and no more than about 1.1 M), inclusive of all values and ranges therebetween. In some embodiments, the lithium salt can have a concentration in the electrolyte of about 0.8 M, about 0.85 M, about 0.9 M, about 0.95 M, about 1 M, about 1.05 M, about 1.1 M, about 1.15 M, or about 1.2 M.

As shown, the cathode 120 includes graphene particles 122. In some embodiments, the cathode 120 can include a conductive additive. In some embodiments, the cathode 120 can include a conductive additive in addition to the graphene particles 122. In some embodiments, the conductive additive can include carbon black. In some embodiments, the cathode 120 can include at least about 0.5 wt %, at least about 1 wt %, at least about 1.5 wt %, at least about 2 wt %, at least about 2.5 wt %, at least about 3 wt %, at least about 3.5 wt %, at least about 4 wt %, or at least about 4.5 wt % conductive additive. In some embodiments, the cathode 120 can include no more than about 5 wt %, no more than about 4.5 wt %, no more than about 4 wt %, no more than about 3.5 wt %, no more than about 3 wt %, no more than about 2.5 wt %, no more than about 2 wt %, no more than about 1.5 wt %, or no more than about 1 wt % conductive additive. Combinations of the above-referenced weight percentages are also possible (e.g., at least about 0.5 wt % and no more than about 5 wt % or at least about 2 wt % and no more than about 4 wt %), inclusive of all values and ranges therebetween. In some embodiments, the cathode 120 can include about 0.5 wt %, about 1 wt %, about 1.5 wt %, about 2 wt %, about 2.5 wt %, about 3 wt %, about 3.5 wt %, about 4 wt %, about 4.5 wt %, or about 5 wt % conductive additive.

In some embodiments, the weight ratio of the conductive additive to the graphene particles 122 can be at least about 0.1:1, at least about 0.2:1, at least about 0.3:1, at least about 0.4:1, at least about 0.5:1, at least about 0.6:1, at least about 0.7:1, at least about 0.8:1, at least about 0.9:1, at least about 1:1, at least about 2:1, at least about 3:1, at least about 4:1, at least about 5:1, at least about 6:1, at least about 7:1, at least about 8:1, or at least about 9:1. In some embodiments, the weight ratio of the conductive additive to the graphene particles 122 can be no more than about 10:1, no more than about 9:1, no more than about 8:1, no more than about 7:1, no more than about 6:1, no more than about 5:1, no more than about 4:1, no more than about 3:1, no more than about 2:1, no more than about 1:1, no more than about 0.9:1, no more than about 0.8:1, no more than about 0.7:1, no more than about 0.6:1, no more than about 0.5:1, no more than about 0.4:1, no more than about 0.3:1, or no more than about 0.2:1. Combinations of the above-referenced weight ratios are also possible (e.g., at least about 0.1:1 and no more than about 10:1 or at least about 0.5:1 and no more than about 5:1), inclusive of all values and ranges therebetween.

In some embodiments, the anode 110 and/or the cathode 120 can include additives. In some embodiments, the additives can include binders, conductive additives, or any combination thereof.

In some embodiments, the battery 100 can include an electrolyte (not shown). In some embodiments, the electrolyte can be non-aqueous. In some embodiments, the electrolyte can include lithium salts or lithium compounds. In some embodiments, the electrolyte can include ethylene carbonate (EC), propylene carbonate (PC), ethyl methyl carbonate (EMC), dimethyl carbonate (DMC), diethyl carbonate (DEC), methyl butyrate (MB) solvents or any combination thereof. In some embodiments, the electrolyte can include vinylene carbonate (VC) and fluoroethylene carbonate (FEC) additives, or any combination thereof. In some embodiments, the lithium salts can include lithium borofluoride (LiBF4), lithium hexafluorophosphate (LiPF6), lithium difluorophosphate (LFO), lithium perchlorate (LiClO4), Li bis(fluorosulfonyl)imide (LIFSI) or any combination thereof. In some embodiments, the electrolyte can include added alkyl decarbonates (i.e., the electrolyte can purposefully include alkyl decarbonates). In some embodiments, the alkyl decarbonates can include dimethyl-2,5-dioxahexane carboxylate (DMOHC), diethyl-2,5-dioxahexane carboxylate (DEOHC) and/or their blends. In some embodiments, the electrolyte can include LiFSI and an alkyl decarbonate.

In some embodiments, the battery 100 can include a centerpin (not shown). In some embodiments, the centerpin can have any of the properties of the centerpins described in U.S. Provisional Patent Application 63/352,814 ("the '814 application"), filed Jun. 16, 2022 and titled, "Rechargeable Cylindrical Battery with Graphene Centerpin, and Methods of Producing the Same," the disclosure of which is hereby incorporated by reference in its entirety.

As shown, the separator 130 is disposed between the anode 110 and the cathode 120. In some embodiments, the separator 130 can include a polyethylene porous film or any other suitable separator material.

Figure 4:
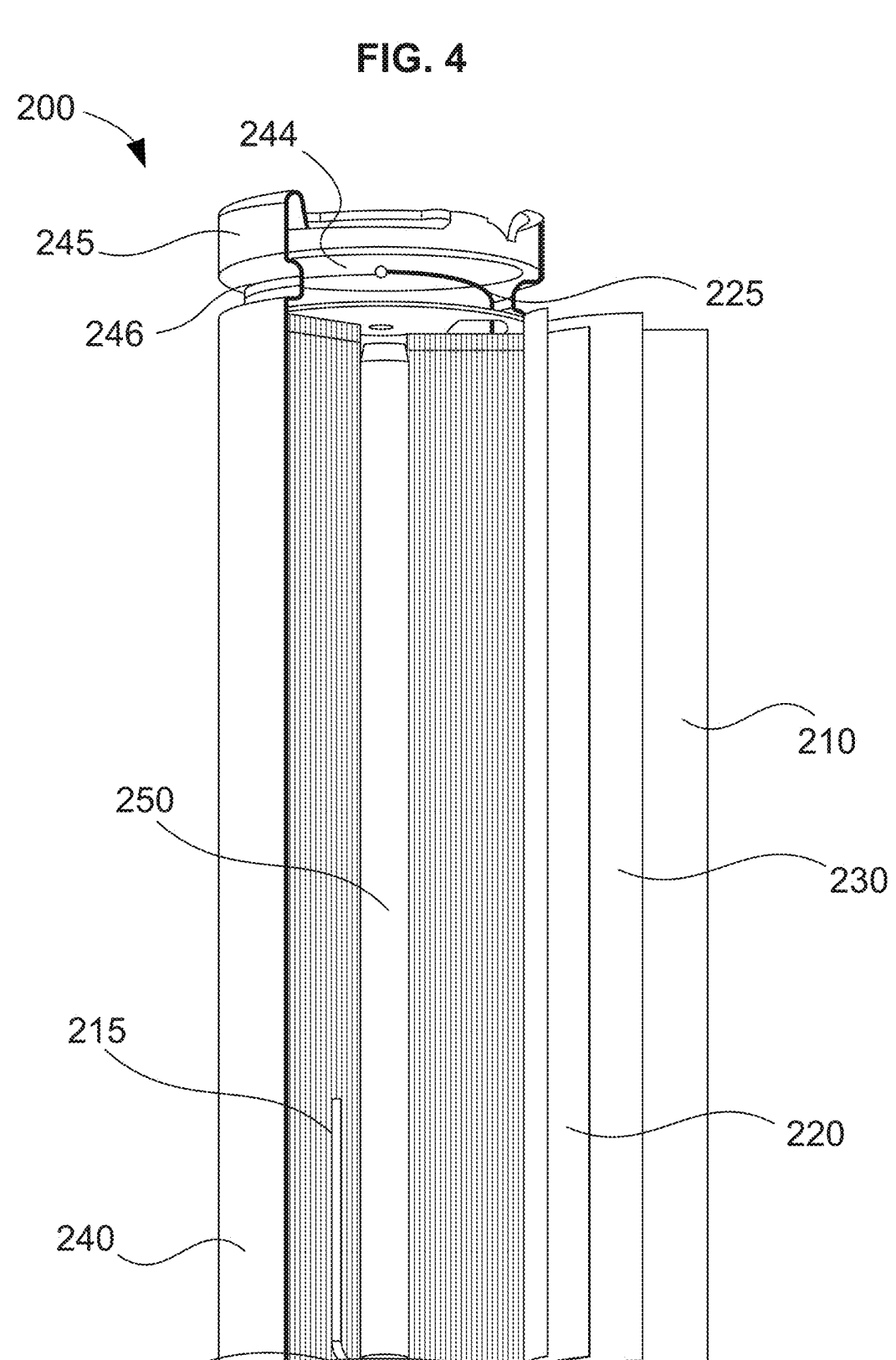
FIG. 4 is an illustration of a secondary battery, according to an embodiment.

FIG. 4 shows a battery 200 with stable SEI layers, according to an embodiment. As shown, the battery 200 includes an anode 210, a cathode 220, a separator 230 disposed between the anode 210 and the cathode 220, an anode tab 215, a cathode tab 225, a housing 240, a bottom insulator 242, a top insulator 244, a top cap assembly 245, a beading 246, and a centerpin 250. In some embodiments, the anode 210, the cathode 220, and the separator 230 can be the same or substantially similar to the anode 110, the cathode 120, and the separator 130, as described above with reference to FIG. 3. Thus, certain aspects of the anode 210, the cathode 220, and the separator 230 are not described in greater detail herein.

In some embodiments, the beading 246 can aid in securing the battery 200 onto various surfaces. In some embodiments, the beading 246 can mechanically lock anode 210 and the cathode 220 in the housing 240, such that the anode 210 and the cathode 220 remain in place if the housing 240 is turned on its side or turned upside down (i.e., before the addition of electrolyte or the placement of the cap assembly 245). The cap assembly 245 aids in holding together the housing 240 and the contents therein. The cap assembly 245 can act as a lid for the battery 200. In some embodiments, the cap assembly 245 can include a vent, or a pathway for gases to escape during thermal runaway. The cap assembly 245 can be designed to facilitate crimping where the anode tab 215 and/or the cathode tab 225 is welded to the cap assembly 245. In other words, the cap assembly 245 can be shaped to facilitate crimping where the housing 240 is sealed. In some embodiments, the centerpin 250 can have any of the properties of the centerpin 250 in the '814 application.

Figure 5:
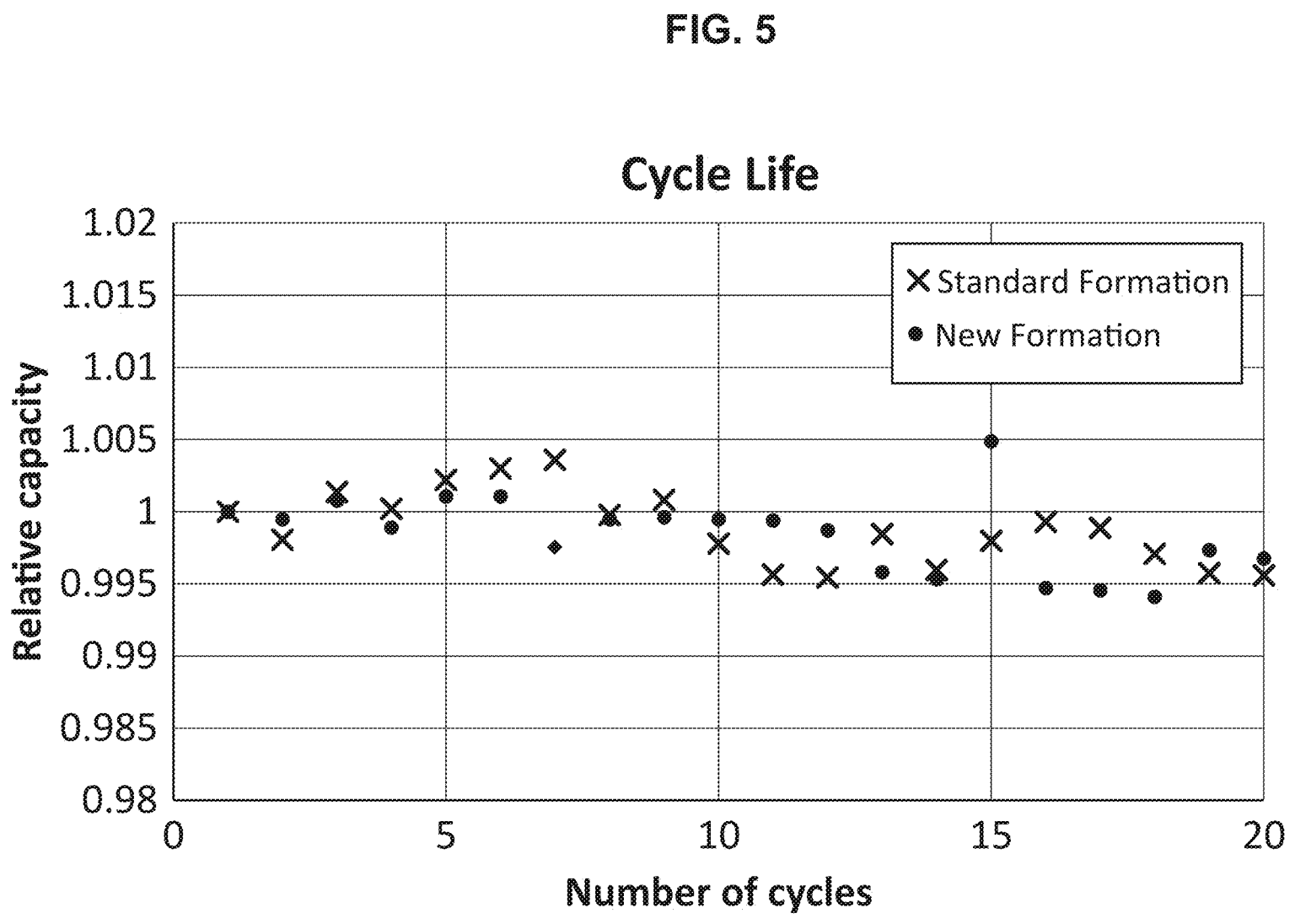

FIG. 5 shows a comparison of the cycle life of a lithium-ion battery formed via standard formation methods and the cycle life of a lithium-ion battery formed via a formation protocol described herein. As shown, the battery formed with the faster formation methods described herein preserves cycle life through 20 cycles just as well as the battery formed with conventional methods. The duration of the formation of the battery formed with the new formation method is approximately 70% shorter than the standard formation method. Yet, the performance and capacity retention of the batteries is virtually identical.

Figure 6:
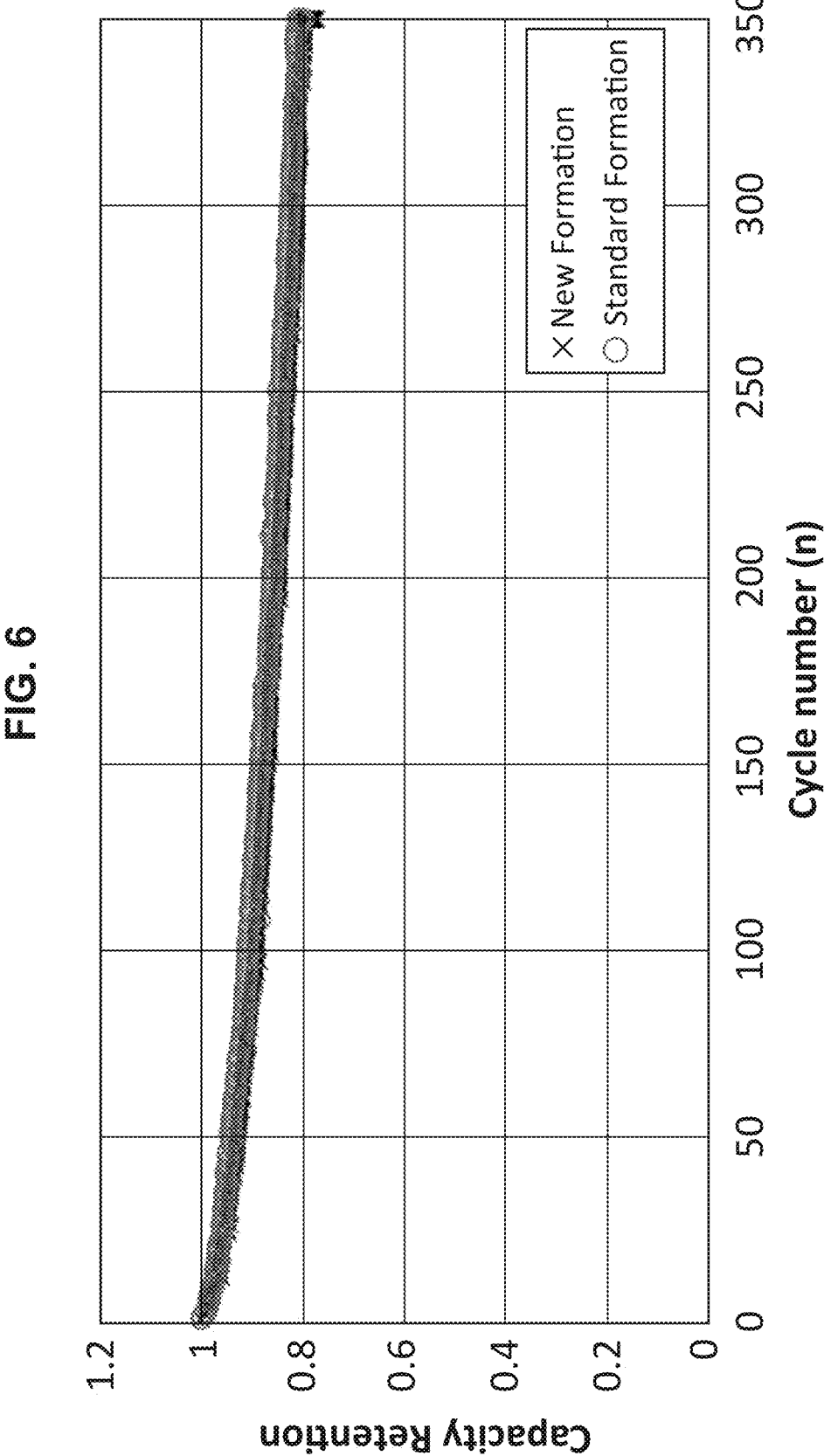
FIG. 6 shows a comparison of the cycle life of a lithium-ion battery formed via standard formation methods and the cycle life of a lithium-ion battery formed via a formation protocol described herein.

FIG. 6 is a comparison of the cycle life of a lithium-ion battery formed via standard formation methods and the cycle life of a lithium-ion battery formed via a formation protocol described herein (i.e., as described in FIG. 2). As shown, the battery formed with the faster formation methods described herein preserves cycle life through 350 cycles just as well as the battery formed with conventional methods. The duration of the formation of the battery formed with the new formation method is approximately 70% shorter than the standard formation method. Yet, the performance and capacity retention of the batteries is virtually identical.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of forming a secondary battery, the method including:

applying a charge to a battery at an initial charge rate, the battery including an anode with silicon particles and graphene particles, a cathode, and a separator disposed between the anode and the cathode, the battery having a maximum voltage of $V_{max}$;

allowing the battery to rest for a first resting period;

applying a charge to the battery at a first formation charge rate;

discharging the battery at a first formation discharge rate;

applying a charge to the battery at a second formation charge rate, the second formation charge rate greater than the first formation charge rate;

discharging the battery at a second formation discharge rate; and applying a charge to the battery at a third formation charge rate to form the secondary battery, the third formation charge rate greater than or equal to the second formation charge rate.

2. The method of claim 1, wherein the first resting period is between about 10 minutes and about 2 hours.

3. The method of claim 1, wherein the battery is a lithium-ion battery.

4. The method of claim 1, further comprising:

after discharging the battery at the first formation discharge rate, allowing the battery to rest for a second resting period, the second resting period between about 30 minutes and about 90 minutes.

5. The method of claim 4, further comprising:

after discharging the battery at the second formation discharge rate, allowing the battery to rest for a third resting period, the third resting period between about 30 minutes and about 12 hours.

6. The method of claim 1, wherein applying the charge to the battery at the third discharge rate brings the battery to between about 20% and about 30% state of charge (SOC).

7. The method of claim 1, wherein the initial charge rate is about 0.015 C to about 0.025 C.

8. The method of claim 7, wherein applying the charge to the battery at the initial charge rate is for about 30 minutes to about 90 minutes.

9. The method of claim 1, wherein the first formation charge rate is between about 0.15 C and about 0.25 C.

10. The method of claim 9, wherein applying the charge to the battery at the first formation charge rate brings the battery to a voltage of about 0.96 $V_{max}$ to about 0.98 $V_{max}$.

11. The method of claim 10, wherein the first formation discharge rate is about 0.15 C to about 0.25 C and discharging the battery at the first formation discharge rate brings the battery to a voltage of about 0.8 $V_{max}$ to about 0.9 $V_{max}$.

12. The method of claim 11, wherein applying the charge to the battery at the first formation charge rate is for about 50 minutes to about 90 minutes.

13. The method of claim 1, wherein the second formation charge rate is between about 0.4 C and about 0.6 C.

14. The method of claim 12, wherein applying the charge to the battery at the second formation charge rate is for about 30 minutes to about 90 minutes.

15. The method of claim 13, wherein the second formation discharge rate is about 0.4 C to about 0.6 C, and discharging the battery at the second formation discharge rate brings the battery to a voltage of about 0.6 $V_{max}$ to about 0.7 $V_{max}$.

16. The method of claim 1, wherein the secondary battery retains a capacity of at least about 70% of its initial capacity after 300 charge/discharge duty cycles.

17. A secondary battery, formed from the method of claim 1.

18. A method of forming a secondary battery, the method including:

applying a charge to a battery at an initial charge rate, the battery having a maximum voltage of $V_{max}$;

allowing the battery to rest for a first resting period;

applying a charge to the battery at a first formation charge rate;

discharging the battery at a first formation discharge rate;

allowing the battery to rest for a second resting period;

applying a charge to the battery at a second formation charge rate, the second formation charge rate greater than the first formation charge rate;

discharging the battery at a second formation discharge rate; and applying a charge to the battery at a third formation charge rate to form the secondary battery, the third formation charge rate greater than or equal to the second formation charge rate.

19. The method of claim 18, wherein the initial charge rate is at a rate of about 0.04 C to about 0.06 C.

20. The method of claim 18, wherein the first resting period is between about 1 hour and about 3 hours.

21. The method of claim 18, wherein the first formation charge rate is a variable charge rate, such that the first formation charge rate increases from a first value to a second value.

22. The method of claim 21, wherein the first value is about 0.06 C and the second value is about 0.12 C.

23. The method of claim 18, wherein the second resting period is between about 14 hours and about 16 hours.

24. The method of claim 18, wherein the second formation charge rate includes a constant current charging phase and a constant voltage charging phase.

25. The method of claim 18, wherein discharging the battery at the second formation discharge rate includes discharging the battery to a SOC between about 60% and about 80%.

26. The method of claim 18, wherein the third formation charge rate is between about 0.4 C to about 0.6 C.

\* \* \* \* \*